US011080913B2

(12) United States Patent
Tsukagoshi

(10) Patent No.: US 11,080,913 B2
(45) Date of Patent: Aug. 3, 2021

(54) PAGE IMAGE DISPLAY CONTROL SYSTEM, PAGE IMAGE DISPLAY CONTROL METHOD, AND PROGRAM THEREFOR

(71) Applicant: FUJIFILM Corporation, Tokyo (JP)

(72) Inventor: Kazuma Tsukagoshi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/797,905

(22) Filed: Feb. 21, 2020

(65) Prior Publication Data

US 2020/0193663 A1 Jun. 18, 2020

Related U.S. Application Data

(62) Division of application No. 15/693,099, filed on Aug. 31, 2017, now Pat. No. 10,607,384.

(30) Foreign Application Priority Data

Sep. 29, 2016 (JP) .................. 2016-190691

(51) Int. Cl.
*G06T 11/60* (2006.01)
*G06K 9/62* (2006.01)
(Continued)

(52) U.S. Cl.
CPC .......... *G06T 11/60* (2013.01); *G06K 9/00624* (2013.01); *G06K 9/6221* (2013.01);
(Continued)

(58) Field of Classification Search
CPC ................ G06T 11/60; G06F 3/0483
See application file for complete search history.

(56) References Cited

U.S. PATENT DOCUMENTS 6,078,005 A 6/2000 Kurakake et al.
6,636,648 B2 * 10/2003 Loui ................ G06T 11/60
348/231.2
(Continued)

FOREIGN PATENT DOCUMENTS

JP H11-341350 A 12/1999
JP 2002-178588 A 6/2002
(Continued)

OTHER PUBLICATIONS

An Office Action; "Notice of Reasons for Refusal," mailed by the Japanese Patent Office dated Apr. 20, 2021, which corresponds to Japanese Patent Application No. 2020-060530 and is related to U.S. Appl. No. 16/797,905; with English language translation.

*Primary Examiner* — Samantha (Yuehan) Wang
(74) *Attorney, Agent, or Firm* — Studebaker & Brackett PC

(57) ABSTRACT

A scene is assigned to each page image, and an image included in the assigned scene is pasted on each page image. A page image addition instruction region is displayed between adjacent page images. In a case where the page image addition instruction region is clicked, a new page image is displayed between two page images between which the clicked page image addition instruction region is interposed. An image included in a scene assigned to a first page image of the two page images or a scene assigned to a second page image of the two page images is pasted on the new page image.

13 Claims, 32 Drawing Sheets

(51) Int. Cl.
　　　*G06K 9/00* 　　　(2006.01)
　　　*G06F 3/0484* 　(2013.01)
　　　*G06F 3/0483* 　(2013.01)

(52) U.S. Cl.
　　　CPC ........ *G06F 3/0483* (2013.01); *G06F 3/04842* (2013.01); *G06T 2200/24* (2013.01)

(56) References Cited

U.S. PATENT DOCUMENTS

| | | | |
|---|---|---|---|
| 8,555,154 B2* | 10/2013 | Chen | H04N 1/00456 |
| | | | 715/230 |
| 10,038,851 B2* | 7/2018 | Kwon | H04N 5/23293 |
| 2009/0089660 A1 | 4/2009 | Atkins et al. | |
| 2012/0151332 A1 | 6/2012 | Kaneko | |
| 2012/0301039 A1 | 11/2012 | Maunder et al. | |
| 2017/0200473 A1 | 7/2017 | Moore et al. | |

FOREIGN PATENT DOCUMENTS

| | | | |
|---|---|---|---|
| JP | 2008-097150 A | 4/2008 |
| JP | 2009-060210 A | 3/2009 |
| JP | 2012-129745 A | 7/2012 |
| JP | 2012-138895 A | 7/2012 |
| JP | 2012-221005 A | 11/2012 |
| JP | 2012-244634 A | 12/2012 |

* cited by examiner

FIG. 6

| PAGE IMAGE | SCENE |
|---|---|
| P1 | SCENES S1, S2 |
| P2 | SCENE S3 |
| P3 | SCENES S4, S5 |
| P4 | SCENE S6 |
| P5 | SCENE S7 |
| P6 | SCENE S8 |
| P7 | SCENES S9, S10 |
| P8 | SCENE S11 |
| P9 | SCENE S12 |
| P10 | SCENES S13, S14, S15 |

FIG. 18

| PAGE IMAGE | SCENE |
|---|---|
| P1 | SCENE S1 |
| P2 | SCENE S2 |
| PA | SCENE S3 |
| P3 | SCENES S4, S5 |
| P4 | SCENE S6 |
| | |

FIG. 26

| PAGE IMAGE | SCENE |
|---|---|
| P1 | SCENES S1, S2 |
| P2 | SCENE S3 |
| P3 | SCENES S4, S5 |
| P4 | SCENE S6 |
| P5 | SCENE S7 |
| P6 | SCENES S8, S9, S10 |
| P8 | SCENE S11 |
| P9 | SCENE S12 |
| P10 | SCENES S13, S14, S15 |

FIG. 28

| PAGE IMAGE | SCENE |
|---|---|
| ⋮ | ⋮ |
| P7 | SCENES S9, S10 |
| P8 | SCENES S10, S11 |
| P9 | SCENE S12 |
| P10 | SCENES S13, S14, S15 |

FIG. 30

| PAGE IMAGE | SCENE |
|---|---|
| ⋮ | ⋮ |
| P5 | SCENES S7, S8 |
| P6 | SCENE S9 |
| P8 | SCENE S10 |
| P9 | SCENES S11, S12 |
| P10 | SCENES S13, S14, S15 |

PAGE IMAGE DISPLAY CONTROL SYSTEM, PAGE IMAGE DISPLAY CONTROL METHOD, AND PROGRAM THEREFOR

CROSS-REFERENCE TO RELATED APPLICATIONS

The present application claims priority under 35 U.S.C. § 119 to Japanese Patent Application No. 2016-190691, filed on Sep. 29, 2016, and U.S. application Ser. No. 15/693,099, filed Aug. 31, 2017 all of which are hereby expressly incorporated by reference into the present application.

BACKGROUND OF THE INVENTION

1. Field of the Invention

The present invention relates to a page image display control system, a page image display control method, and a non-transitory computer readable medium storing a program therefor.

2. Description of the Related Art

It has been realized that a user selects images from a large number of images and generates an album using the images selected by the user. Since it is difficult for the user to select desired images from a large number of images, a computer extracts images according to the image extraction algorithm and generates an album including a plurality of pages using the extracted images. Examples of such a system include a system that displays an electronic album of two pages in a spread (JP2002-178588A) and a system that displays each page of an album as a list (JP2008-97150A). In addition, in a case where a page is added to an album or a page is deleted from an album, an image straddling the double-page spread is shifted. Accordingly, preventing such a shift has been considered (JP2009-60210A). For multimedia editing, there is a technique of recording sequence information of image progression along the flow of music (JP1999-341350A (JP-H11-341350A)).

SUMMARY OF THE INVENTION

In a case where inserting a new page between pages forming an album is considered, if an image is pasted on the new page regardless of the sequence of images pasted on the album, the sequence of images is damaged. JP2002-178588A discloses displaying two spread pages, but the case of inserting a new page into the album has not even been considered. JP2008-97150A discloses that a page can be added, but the flow of an image pasted on the album has not been considered. JP2009-60210A discloses preventing the shift of an image straddling a page in a case where the page is added or deleted, but the flow of an image pasted on the album has not been considered. JP1999-341350A (JP-H11-341350A) discloses recording the sequence information of image progression in a format conforming to the flow of music, but the case of inserting a new page into the album has not even been considered. In the case of deleting a page forming an album, if a page to be deleted is not clear, a page other than the page to be deleted may be deleted.

It is an object of the invention to enable pasting an image along the flow of images, which are pasted on a plurality of page images, on a new page in a case where a new page image is added between the plurality of page images. In addition, it is an object of the invention to make it easy to understand a page image to be deleted.

A page image display control system according to a first invention comprises: first page image display control unit that displays a plurality of page images, on which images included in a scene assigned among divided scenes in a case where a plurality of images are divided for each scene are pasted, on a display screen of a display device; page image addition instruction region display control unit that displays a page image addition instruction region between adjacent page images among the plurality of page images displayed on the display screen under control of the first page image display control unit; and second page image display control unit that displays a new page image between two page images, between which the page image addition instruction region to which a page image addition instruction is given is interposed, on the display screen of the display device in response to the page image addition instruction given to the page image addition instruction region displayed under control of the page image addition instruction region display control unit, the new page image being pasted with an image included in at least one of a scene assigned to a first page image included in the two page images or a scene assigned to a second page image included in the two page images.

The invention also provides a page image display control method suitable for the page image display control system. That is, the method comprises: causing first page image display control unit to display a plurality of page images, on which images included in a scene assigned among divided scenes in a case where a plurality of images are divided for each scene are pasted, on a display screen of a display device; causing page image addition instruction region display control unit to display a page image addition instruction region between adjacent page images among the plurality of page images displayed on the display screen under control of the first page image display control unit; and causing second page image display control unit to display a new page image between two page images, between which the page image addition instruction region to which a page image addition instruction is given is interposed, on the display screen of the display device in response to the page image addition instruction given to the page image addition instruction region displayed under control of the page image addition instruction region display control unit, the new page image being pasted with an image included in at least one of a scene assigned to a first page image included in the two page images or a scene assigned to a second page image included in the two page images.

The first invention also provides a non-transitory computer readable medium storing a program for executing the page image display control method and a recording medium in which the program is stored.

An image extracted from a scene having a larger number of images between the number of images, which are included in the scene assigned to the first page image included in the two page images, and the number of images, which are included in the scene assigned to the second page image included in the two page images, may be pasted on the new page image displayed on the display screen of the display device by the second page image display control unit.

Extraction of an image pasted on the first page image may be performed again in a case where an image included in the scene assigned to the first page image is pasted on the new page image displayed on the display screen of the display device by the second page image display control unit, and extraction of an image pasted on the second page image may be performed again in a case where an image included in the scene assigned to the second page image is pasted on the new page image displayed on the display screen of the display device by the second page image display control unit.

Images included in the scenes assigned to the two page images may be pasted on the new page image displayed on the display screen of the display device by the second page image display control unit.

Extraction of images pasted on the two page images may be performed again.

The scene assigned to the first page image included in the two page images and the scene assigned to the second page image included in the two page images may be divided into a first scene, a second scene, and a third scene, and the first page image is generated using an image included in the first scene, the new page image is generated using an image included in the second scene, and the second page image may be generated using an image included in the third scene.

Some of a plurality of scenes assigned to the first page image included in the two page images may be assigned to the first page image or the new page image, and the first page image or the new page image may be generated using an image included in each assigned scene. Some of a plurality of scenes assigned to the second page image included in the two page images may be assigned to the second page image or the new page image, and the second page image or the new page image may be generated using an image included in each assigned scene. Some of a plurality of scenes assigned to the two page images may be assigned to the first page image, the second page image, or the new page image, and the first page image, the second page image, or the new page image may be generated using an image included in each assigned scene.

The page image display control system may further comprise: page image designation unit that designates a plurality of page images including the two page images among the plurality of page images displayed on the display screen of the display device under control of the first page image display control unit; and scene assignment unit that assigns a plurality of scenes assigned to the plurality of page images designated by the page image designation unit to the plurality of page images designated by the page image designation unit and the new page image. In this case, each of the plurality of page images designated by the page image designation unit and the new page image can be generated using images included in the scenes assigned by the scene assignment unit.

The page image designation unit designates all of the plurality of page images displayed on the display screen of the display device under control of the first page image display control unit, for example.

The page image display control system may further comprise: image display control unit that displays a plurality of images on the display screen of the display device; partition line display control unit that displays a region partition line, which is for displaying the plurality of images displayed on the display screen under control of the image display control unit in a plurality of regions different for each scene, on the display screen of the display device; and page image generation unit that generates a plurality of page images in which an image extracted from images included in the regions partitioned off by the partition line displayed on the display screen under control of the partition line display control unit is pasted on a mount image. In this case, it is preferable that the first page image display control unit displays the plurality of page images generated by the page image generation unit on the display screen of the display device and that the partition line display control unit adds a partition line of a region, in which an image pasted on a page image adjacent to a new page image is included, in response to the new page image being displayed on the display screen by the second page image display control unit.

A page image display control system according to a second invention comprises: first page image display control unit that displays a plurality of page images, on which an image is pasted, on a display screen of a display device; page image deletion instruction region display control unit that displays a page image deletion instruction region on the display screen of the display device corresponding to each of the plurality of page images displayed on the display screen under control of the first page image display control unit; and page image deletion control unit that deletes a page image corresponding to the page image deletion instruction region, to which a page image deletion instruction is given, from the display screen of the display device in response to the page image deletion instruction given to the page image deletion instruction region displayed under control of the page image deletion instruction region display control unit.

The second invention also provides a control method suitable for the page image display control system. That is, the method comprises: causing page image display control unit to display a plurality of page images, on which an image is pasted, on a display screen of a display device; causing page image deletion instruction region display control unit to display a page image deletion instruction region on the display screen of the display device corresponding to each of the plurality of page images displayed on the display screen under control of the page image display control unit; and causing page image deletion control unit to delete a page image corresponding to the page image deletion instruction region, to which a page image deletion instruction is given, from the display screen of the display device in response to the page image deletion instruction given to the page image deletion instruction region displayed under control of the page image deletion instruction region display control unit.

The second invention also provides a non-transitory computer readable medium storing a program for executing the page image display control method.

In a case where each scene in a case where a plurality of images are divided for each scene is assigned to the page images displayed on the display screen of the display device under control of the first page image display control unit and images included in each assigned scene are pasted on the page images displayed on the display screen of the display device under control of the first page image display control unit, a scene assigned to each page image deleted under control of the page image deletion control unit may be additionally assigned to at least one of a first page image or a second page image between which the deleted page image is interposed, and at least one of the first page image or the second page image may be generated using images included in already assigned scenes and the additionally assigned scene.

In a case where the same scene as a scene assigned to the page image deleted by the page image deletion control unit is assigned to another page image, an image may be extracted from images included in the scene assigned to the deleted page image, and another page image may be generated again using the extracted image.

In a case where each scene in a case where a plurality of images are divided for each scene is assigned to the plurality of page images displayed on the display screen of the display device under control of the first page image display control unit, and images included in each assigned scene are pasted on the plurality of page images displayed on the display screen of the display device under control of the first page image display control unit, page image designation unit that designates a plurality of page images including two page images, between which the page image deleted by the page image deletion control unit is interposed, among the plurality of page images displayed on the display screen of the display device under control of the first page image display control unit and scene assignment unit that assigns a scene, which is assigned to the page image deleted by the page image deletion control unit, and a plurality of scenes, which are assigned to the plurality of page images designated by the page image designation unit, to the plurality of scenes assigned to the plurality of page images designated by the page image designation unit may be further comprised. In this case, it is preferable that each of the plurality of page images designated by the page image designation unit is generated using images included in the scenes assigned by the scene assignment unit.

The page image designation unit designates all of the plurality of page images displayed on the display screen of the display device under control of the first page image display control unit, for example.

The page image display control system may further comprise: image display control unit that displays a plurality of images on the display screen of the display device; partition line display control unit that displays a region partition line, which is for displaying the plurality of images displayed on the display screen under control of the image display control unit in a plurality of regions different for each scene, on the display screen of the display device; and page image generation unit that generates a plurality of page images in which an image extracted from images included in the regions partitioned off by the partition line displayed on the display screen under control of the partition line display control unit is pasted on a mount image. In this case, the first page image display control unit may display, for example, the plurality of page images generated by the page image generation unit on the display screen of the display device. The image display control unit may display a region, in which an image pasted on the page image deleted by the page image deletion control unit is included, so as to be distinguished from other regions.

A page image display control system according to a third invention comprises: image display control unit that displays a plurality of images on a display screen of a display device; partition line display control unit that displays a region partition line, which is for displaying the plurality of images displayed on the display screen under control of the image display control unit in a plurality of regions different for each scene, on the display screen of the display device; page image generation unit that generates a plurality of page images in which an image extracted from images included in the regions partitioned off by the partition line displayed on the display screen under control of the partition line display control unit is pasted on a mount image; page image display control unit that displays the plurality of page images generated by the page image generation unit on the display screen of the display device; and page image addition unit that adds a new page image so as to be adjacent to any one of the plurality of page images displayed on the display screen under control of the page image display control unit. The partition line display control unit adds a partition line of a region, in which an image pasted on a page image adjacent to an added page image is included, in response to the new page image being added by the page image addition unit.

The third invention also provides a page image display control method suitable for the page image display control system. That is, the page image display control method comprises: causing image display control unit to display a plurality of images on a display screen of a display device; causing partition line display control unit to display a region partition line, which is for displaying the plurality of images displayed on the display screen under control of the image display control unit in a plurality of regions different for each scene, on the display screen of the display device; causing page image generation unit to generate a plurality of page images in which an image extracted from images included in the regions partitioned off by the partition line displayed on the display screen under control of the partition line display control unit is pasted on a mount image; causing page image display control unit to display the plurality of page images generated by the page image generation unit on the display screen of the display device; and causing page image addition unit to add a new page image so as to be adjacent to any one of the plurality of page images displayed on the display screen under control of the page image display control unit. The partition line display control unit adds a partition line of a region, in which an image pasted on a page image adjacent to an added page image is included, in response to the new page image being added by the page image addition unit.

The third invention also provides a non-transitory computer readable medium storing a program for executing the page image display control method.

A page image display control system according to a fourth invention comprises: image display control unit that displays a plurality of images on a display screen of a display device; partition line display control unit that displays a region partition line, which is for displaying the plurality of images displayed on the display screen under control of the image display control unit in a plurality of regions different for each scene, on the display screen of the display device; page image generation unit that generates a plurality of page images in which an image extracted from images included in the regions partitioned off by the partition line displayed on the display screen under control of the partition line display control unit is pasted on a mount image; page image display control unit that displays the plurality of page images generated by the page image generation unit on the display screen of the display device; and page image deletion unit that deletes a page image for which a page image deletion instruction is given, among the plurality of page images displayed on the display screen under control of the page image display control unit, in response to the page image deletion instruction. The image display control unit displays a region, in which an image pasted on the page image deleted by the page image deletion unit is included, so as to be distinguished from other regions.

The fourth invention also provides a page image display control method suitable for the page image display control system. That is, the method comprises: causing image display control unit to display a plurality of images on a display screen of a display device; causing partition line display control unit to display a region partition line, which is for displaying the plurality of images displayed on the display screen under control of the image display control unit in a plurality of regions different for each scene, on the display screen of the display device; causing page image generation unit to generate a plurality of page images in which an image extracted from images included in the regions partitioned off by the partition line displayed on the display screen under control of the partition line display control unit is pasted on a mount image; causing page image display control unit to display the plurality of page images generated by the page image generation unit on the display screen of the display device; and causing page image deletion unit to delete a page image for which a page image deletion instruction is given, among the plurality of page images displayed on the display screen under control of the page image display control unit, in response to the page image deletion instruction. The image display control unit displays a region, in which an image pasted on the page image deleted by the page image deletion unit is included, so as to be distinguished from other regions.

The fourth invention also provides a non-transitory computer readable medium storing a program for executing the page image display control method.

According to the first invention, a plurality of page images are displayed on the display screen, and a page image addition instruction region is displayed between adjacent page images. In a case where a page image addition instruction is given to the page image addition instruction region, a new page image is displayed between two page images between which the page image addition instruction region to which the page image addition instruction has been given is interposed. An image included in at least one of the scene assigned to the first page image included in the two page images or the scene assigned to the second page image included in the two page images is pasted on the new page image. Therefore, the image pasted on the new page image follows the flow of the images.

According to the second invention, a plurality of page images are displayed on the display screen. A page image deletion instruction region is displayed corresponding to each of the plurality of page images. In a case where a page image deletion instruction is given to the page image deletion instruction region, a page image corresponding to the page image deletion instruction region to which the page image deletion instruction has been given is deleted. Since the page image deletion instruction region is displayed, it is easy to understand a page image to be deleted. Therefore, deletion of a page image, which is not to be deleted, is prevented.

According to the third invention, a partition line is displayed so that a plurality of images are displayed in different regions for each scene. A plurality of page images, in which an image extracted from images included in the regions partitioned off by the partition line is pasted on the mount image, are displayed. In a case where a new page image is added adjacent to any one of page images, a partition line in which an image pasted on a page image adjacent to the added page image is included is added. Even in a case where a page image is added, it is possible to grasp a region classified for each scene.

Also in the fourth invention, a partition line is displayed so that a plurality of images are displayed in different regions for each scene, and a plurality of page images, in which an image extracted from images included in the regions partitioned off by the partition line is pasted on the mount image, are displayed. In a case where a page image deletion instruction is given, a region, in which an image pasted on the page image to which the page image deletion instruction has been given is included, is displayed so as to be distinguished from other regions. Therefore, it is possible to check a region where an image pasted on the deleted page image is included.

BRIEF DESCRIPTION OF THE DRAWINGS

FIG. 6 is an example of a page image table.

FIG. 18 is an example of a page image table.

FIG. 26 is an example of a page image table.

FIG. 28 is an example of a page image table.

FIG. 30 is an example of a page image table.

DESCRIPTION OF THE PREFERRED EMBODIMENTS

First Embodiment

Figure 1:
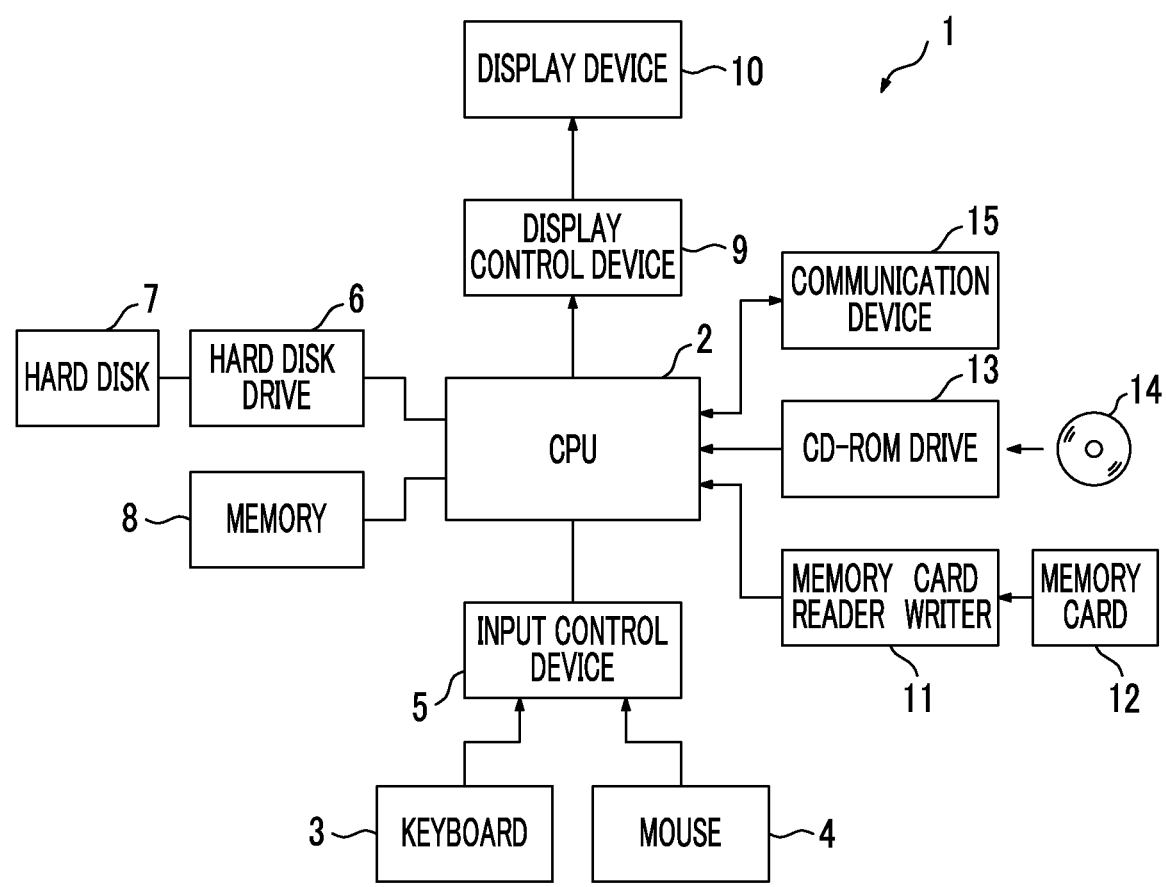
FIG. 1 is a block diagram showing the electrical configuration of a page image display control system.

FIG. 1 shows an embodiment of the invention, and is a block diagram showing the electrical configuration of a page image display control system 1.

The overall operation of the page image display control system 1 is realized by a central processing unit (CPU) 2.

The page image display control system 1 includes a keyboard 3 and a mouse 4 as input devices for giving commands or the like to the page image display control system 1. The commands or the like from the keyboard 3 and the mouse 4 are given to the CPU 2 through an input control device 5. In addition, the page image display control system 1 includes a memory 8 for temporarily storing data or the like, a hard disk 7, a hard disk drive 6 for accessing the hard disk 7, a display device 10, and a display control device 9 for controlling the display device 10.

The page image display control system 1 further includes a memory card reader writer 11 for accessing a memory card 12, a CD-ROM drive 13 for accessing a compact disc read only memory (CD-ROM) 14, and a communication device 15 for connection with a network, such as the Internet.

The CD-ROM 14 (recording medium), in which a computer-readable program for controlling an operation to be described later is stored, is read by the CD-ROM drive 13, and the read program is installed in the page image display control system 1. Such a program may be stored in a portable recording medium, such as the memory card 12 other than the CD-ROM 14, or may be installed in the page image display control system 1 in advance. A program may be received by the communication device 15 through a network, such as the Internet, and the received program may be installed in the page image display control system 1.

Figure 2:
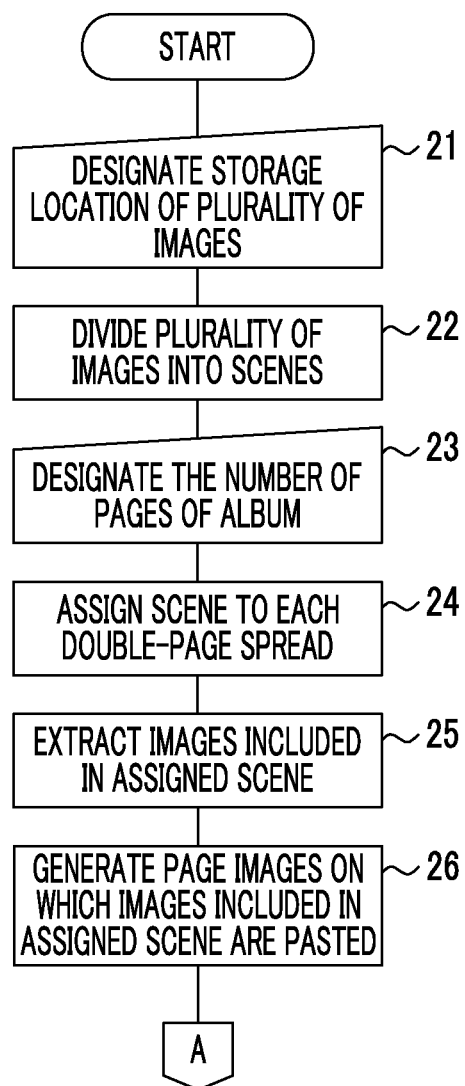
FIG. 2 is a flowchart showing the processing procedure of the page image display control system.
Figure 3:
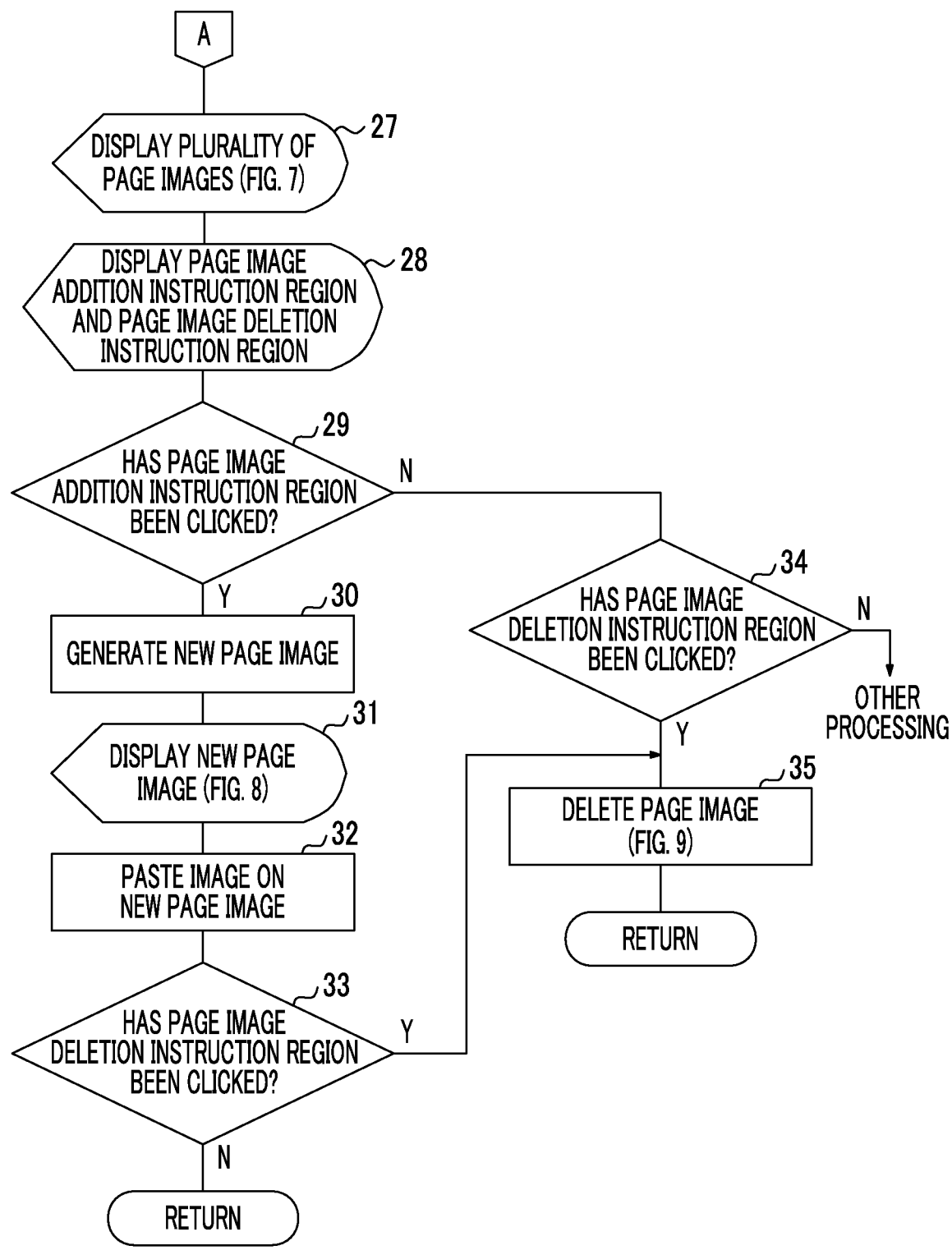
FIG. 3 is a flowchart showing the processing procedure of the page image display control system.

FIGS. 2 and 3 are flowcharts showing the processing procedure of the page image display control system 1. A part of the processing performed in the case of generating an album (electronic album) is shown in FIGS. 2 and 3.

A storage location designation image for designating a storage location where a plurality of images are stored is displayed on the display screen of the display device 10. Using the storage location designation image, the user can designate a storage location, such as a storage region on the hard disk 7, the CD-ROM 14, the memory card 12, and the network. In a case where a universal serial bus (USB) memory (not shown) can be connected to the page image display control system 1, the USB memory can also be designated as a storage location. The user uses the keyboard 3 or the mouse 4 to designate a storage location of images used for generation of an album (step 21). In the present embodiment, it is assumed that the memory card 12 is designated as a storage location of images by the user. A range of a plurality of images may be further specified from a plurality of images stored in the storage location of images before designating the storage location of images or after designating the storage location of images. For example, an imaging period may be designated, and a plurality of images capture within the designated imaging period may be specified from the plurality of images stored in the storage location of images.

Figure 4:
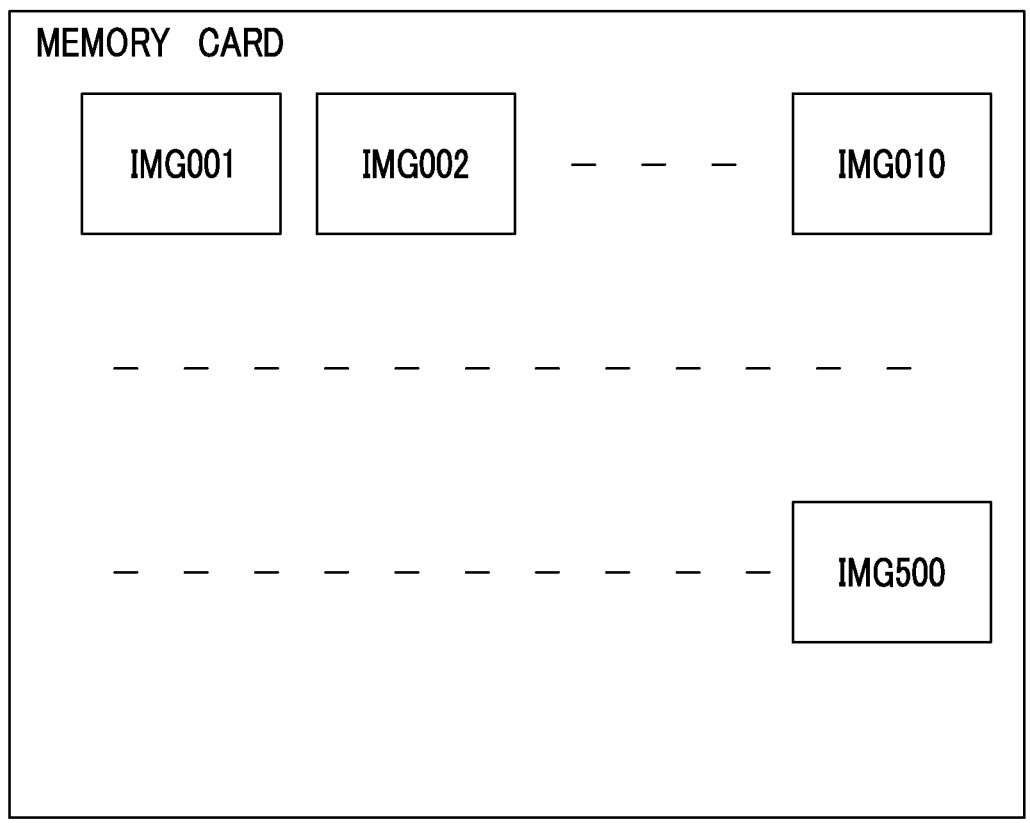
FIG. 4 shows image files stored in a memory card.

FIG. 4 shows image files stored in the memory card 12.

It is assumed that 500 image files represented by image file names from IMG001 to IMG500 are stored in the memory card 12. However, the image file names do not need to be consecutive. For example, the user goes on a trip with the memory card 12, and performs imaging in the trip destination or the like. As a result, 500 image files are stored in the memory card 12. In addition to a single event, such as a trip, image files obtained by imaging at a wedding ceremony and image files obtained by imaging in a trip (for example, a honeymoon) after the wedding ceremony may be stored in the memory card 12. In this manner, image files obtained by imaging at a plurality of events may be stored in the memory card 12 (not limited to the memory card 12).

Referring back to FIG. 2, a plurality of image files stored in the memory card 12 are read by the CPU 2, and the plurality of images are divided by the CPU 2 for each scene (step 22).

Figure 5:
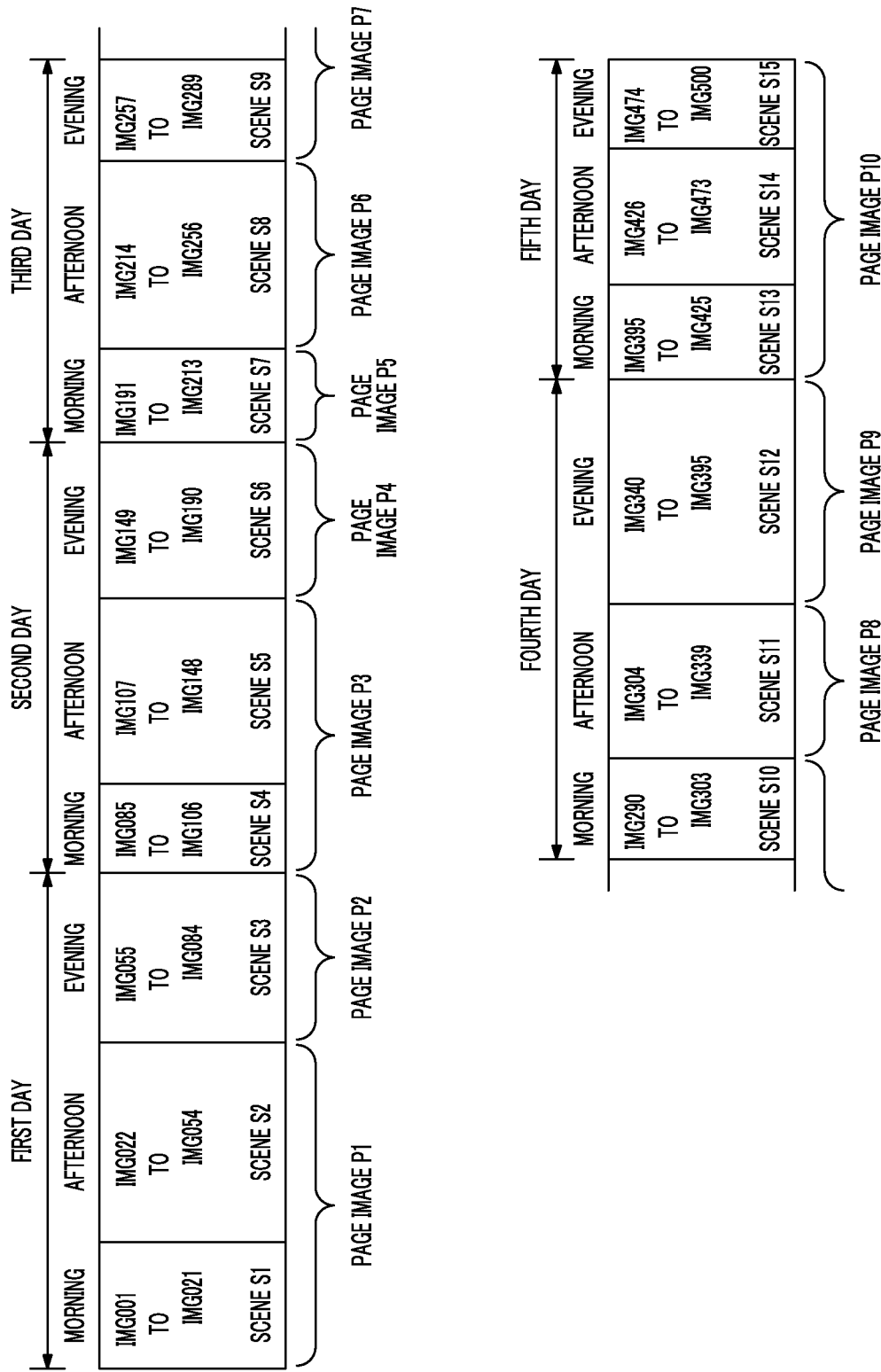
FIG. 5 shows how a plurality of images are divided for each scene.

FIG. 5 shows how a plurality of images are divided for each scene.

It is assumed that 500 image files stored in the memory card 12 are obtained by imaging on a trip of four nights five days. Five days are divided into the morning, afternoon, and evening, so that the 500 images are divided into 15 scenes from scene S1 to scene S15. Data indicating the imaging date and time is stored in the header of the file, and the 500 images are divided using the data indicating the imaging date and time. For example, the scene S1 (morning on the first day) includes 21 images represented by image file names IMG001 to IMG021, the scene S2 (afternoon on the first day) includes 32 images represented by image file names IMG022 to IMG054, and the scene S3 (night on the first day) includes 29 images represented by image file names IMG055 to IMG084. Other scenes are also divided into the scenes S4 to S15 based on the imaging date and time.

In the present embodiment, a plurality of images are divided for each scene using the imaging date and time. However, a plurality of images may be divided for each scene using other methods, such as each event, instead of the imaging date and time. For example, in a case where there are images of a plurality of events, such as basketball game images, baseball game images, and tennis game images, a plurality of images may be divided for each scene by dividing the plurality of images for each event, such as basketball, baseball, and tennis.

Referring back to FIG. 2, the number of pages of the album is designated by the user using the keyboard 3 (step 23). In the present embodiment, it is assumed that the number of pages of the album is designated as 20 (a case where two pages on the left and right of the spread are not set as one page but set as two pages). However, the number of pages of the album may be designated as another number. Considering the double-page spread as one page, the number of pages is 10 pages.

Then, the divided scene is assigned for each double-page spread by the CPU 2 (step 24). In the present embodiment, the image of the double-page spread is displayed on the display screen of the display device 10 (refer to FIG. 7). The image of the double-page spread is referred to as a page image. However, the page image may be displayed on the display screen of the display device 10 for each page instead of the double-page spread. In this case, an image of one page that is not spread is the page image.

FIG. 6 is an example of a page image table.

The page image table shows the relationship between the page image and the scene assigned to the page image. Since the page image corresponds to the double-page spread (or each page), the scene assigned to the page image is a scene assigned to the double-page spread (or each page).

Since the number of pages of the album designated by the user is 10 pages in a case where the double-page spread is considered, the ten page images P1 to P10 are stored in the page image table. Corresponding to the page images P1 to P10, scene identification data is stored in the page image table. The scenes S1 and S2 are assigned to the page image P1, and the scene S3 is assigned to the page image P2. Similarly, the scenes S4 and S5 are assigned to the page image P3, the scene S6 is assigned to the page image P4, the scene S7 is assigned to the page image P5, the scene S8 is assigned to the page image P6, the scenes S9 and S10 are assigned to the page image P7, the scene S11 is assigned to the page image P8, the scene S12 is assigned to the page image P9, and the scenes S13, S14, and S15 are assigned to the page image P10.

Referring back to FIG. 2, images included in the scene assigned to the double-page spread (page image) are extracted by the CPU 2 (step 25). The number of images pasted on the double-page spread is determined in advance for each double-page spread (may be added), and the determined number of images are extracted. For example, six images can be pasted on the first double-page spread (page image P1), and six images, among images included in the scenes S1 and S2 assigned to the first double-page spread (page image P1), are extracted by the CPU 2. Images may be extracted based on any evaluation criteria, such as images with high evaluation as images, images with long imaging dates and times, and images with high evaluation for a main subject. For example, on the first double-page spread (page image P1), images of image file names IMG001, IMG012, IMG019, IMG021, IMG041, and IMG048 are extracted from the images of the scenes S1 and S2. The extracted images are pasted on the first double-page spread (page image P1) by the CPU 2.

Similarly for the page images P2 to P10 other than the page image P1, images are extracted from the scenes assigned to each page image and are pasted. In this manner, the page images P1 to P10 on which images included in the assigned scene are pasted are generated by the CPU 2 (step 26). In a case where the page images P1 to P10 are generated, the generated page images P1 to P10 are displayed on the display screen of the display device 10 by the display control device 9 (first page image display control unit) (step 27). In a case where a plurality of images are divided for each scene, a plurality of page images on which an image included in the assigned scene among the divided scenes is pasted are displayed on the display screen of the display device 10 by the display control device 9.

Figure 7:
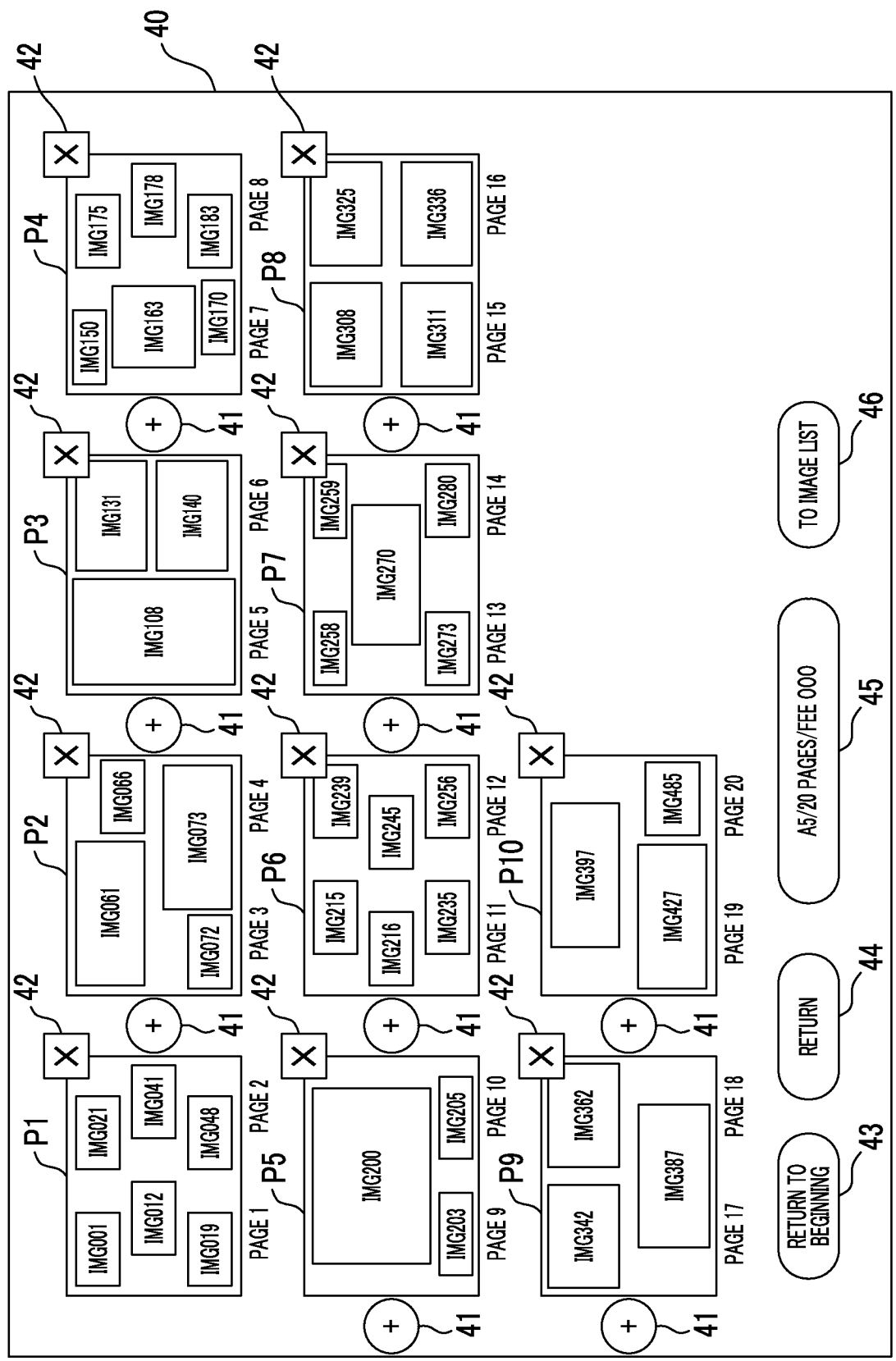
FIG. 7 is an example of a page image list window.

FIG. 7 is an example of a page image list window 40 displayed on the display screen of the display device 10.

The page image list window 40 includes a plurality of page images P1 to P10. As described above, images (thumbnail images) extracted from the images included in the scenes assigned to the respective page images are pasted on each of the plurality of page images P1 to P10.

A page image addition instruction region 41 is displayed between adjacent page images among the plurality of page images P1 to P10. In the page image addition instruction region 41, a symbol of plus is given inside a circle (may not be a circle). The page image addition instruction region 41 may be determined to be present between other adjacent page image addition instruction regions, or may overlap another page image addition instruction region 41 or may not overlap another page image addition instruction region 41. Even in a case where adjacent page images are in contact with each other, if the page image addition instruction region 41 is present on the boundary between the adjacent page images, the page image addition instruction region 41 is present between the adjacent page image addition instruction regions 41. The display device 10 is controlled so that the page image addition instruction region 41 is displayed by the display control device 9 (page image addition instruction region display control unit).

Corresponding to each of the plurality of page images P1 to P10, a page image deletion instruction region 42 is displayed. In the page image deletion instruction region 42, a cross is marked inside a rectangle (may not be a rectangle). The page image deletion instruction region 42 is displayed on the upper right of each of the plurality of page images P1 to P10 so as to overlap a part of the page image. However, the page image deletion instruction region 42 may be located at any place, such as above or below the page image, as long as the page image deletion instruction region 42 is displayed corresponding to the page image. The page image deletion instruction region 42 is also displayed on the display screen of the display device 10 by the control of the display control device 9 (page image deletion instruction region display control unit).

The page image list window 40 further includes an initial window display button 43 to which the character "return to the beginning" is attached, a window return button 44 to which the character "back" is attached, an album information display region 45 where the size of each page of an album, the number of pages, and the fee are displayed, and a list display button 46 to which the character "to image list" is attached. In a case where the initial window display button 43 is clicked by the user using the mouse 4, a window that is first displayed in album generation processing is displayed on the display screen of the display device 10. In a case where the window return button 44 is clicked by the user using the mouse 4, a window that is displayed before the page image list window 40 is displayed on the display screen of the display device 10. In a case where the list display button 46 is clicked by the user using the mouse 4, an image (thumbnail image) stored in the image storage location designated by the user is displayed on the display screen of the display device 10 as a list.

In this manner, the page image addition instruction region 41 and the page image deletion instruction region 42 are displayed (step 28 in FIG. 3).

In a case where the page image addition instruction region 41 is clicked by the user (in a case where a page image addition instruction is given) (YES in step 29), a new page image is generated by the CPU 2 (step 30). Needless to say, a page image already generated may be used as a new page image without generating a new page image.

Figure 8:
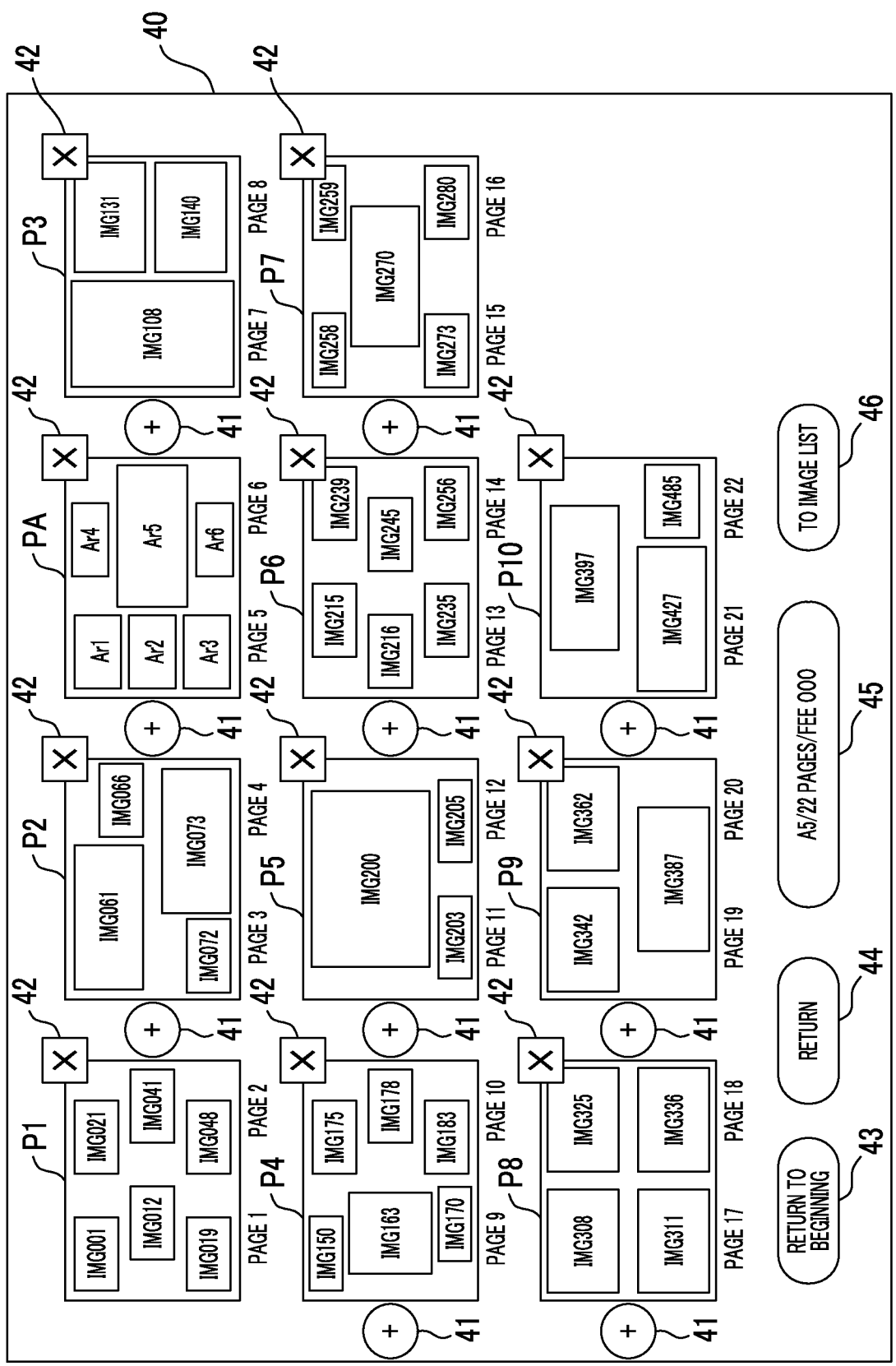
FIG. 8 is an example of a page image list window.

In a case where a new page image is generated or a page image already generated is selected as a new page image, the display device 10 is controlled by the display control device 9 (second page image display control unit) so that the new page image is displayed between two page images between which the page image addition instruction region 41 that has been clicked (for which a page image addition instruction has been given) is interposed (step 31). For example, it is assumed that the page image addition instruction region 41 located between the page image P2 and the page image P3 is clicked by the user. Then, as shown in FIG. 8, a new page image PA is displayed between the page image P2 and the page image P3 (step 31). The page image addition instruction region 41 is displayed between the new page image PA and the page image P2 adjacent thereto and between the new page image PA and the page image P3 adjacent thereto, and the page image deletion instruction region 42 is also displayed in the new page image PA.

In the new page image PA, image pasting regions Ar1 to Ar6 where images are pasted are formed. On the image pasting regions Ar1 to Ar6 formed in the new page image PA, images included in at least one of a scene, which is assigned to the first page image P2 included in the two page images P2 and P3 between which the clicked page image addition instruction region 41 is interposed, or a scene assigned to the second page image P3 are pasted by the CPU 2 (step 32). As shown in FIG. 6, the scene S3 is assigned to the page image P2 (first page image). Therefore, images extracted from images represented by image file names IMG055 to IMG084 included in the scene S3 are pasted on the image pasting regions Ar1 to Ar6 of the new page image PA. As shown in FIG. 6, the scenes S4 and S5 are assigned to the page image P3 (second page image). Therefore, images extracted from images represented by image file names IMG085 to IMG106 included in the scene S4 or images extracted from images represented by image file names IMG107 to IMG148 included in the scene S5 may be pasted on the image pasting regions Ar1 to Ar6 of the new page image PA. Needless to say, it is preferable that an image to be pasted on the new page image PA is different from an image already pasted on the page image P2 or the page image P3.

In an album information display region 45, since the number of pages of the album increases due to the addition of the new page image PA, the increased number of pages is displayed. In a case where the fee is changed by the addition of the new page image PA, the changed due is displayed in the album information display region 45.

In a case where the page image deletion instruction region 42 is clicked by the user (in a case where a page image deletion instruction is given to the page image deletion instruction region 42) (YES in step 33 or 34), the page image corresponding to the clicked page image deletion instruction region 42 is deleted from the display screen of the display device 10 by the CPU 2 (page image deletion control unit) (step 35). In any of a case where the page image addition instruction region 41 is not clicked (NO in step 29) and the page image deletion instruction region 42 is clicked (YES in step 34) and a case where the page image addition instruction region 41 is clicked (YES in step 29) and the page image deletion instruction region 42 is clicked (YES in step 33), the page image corresponding to the clicked page image deletion instruction region 42 is deleted.

Figure 9:
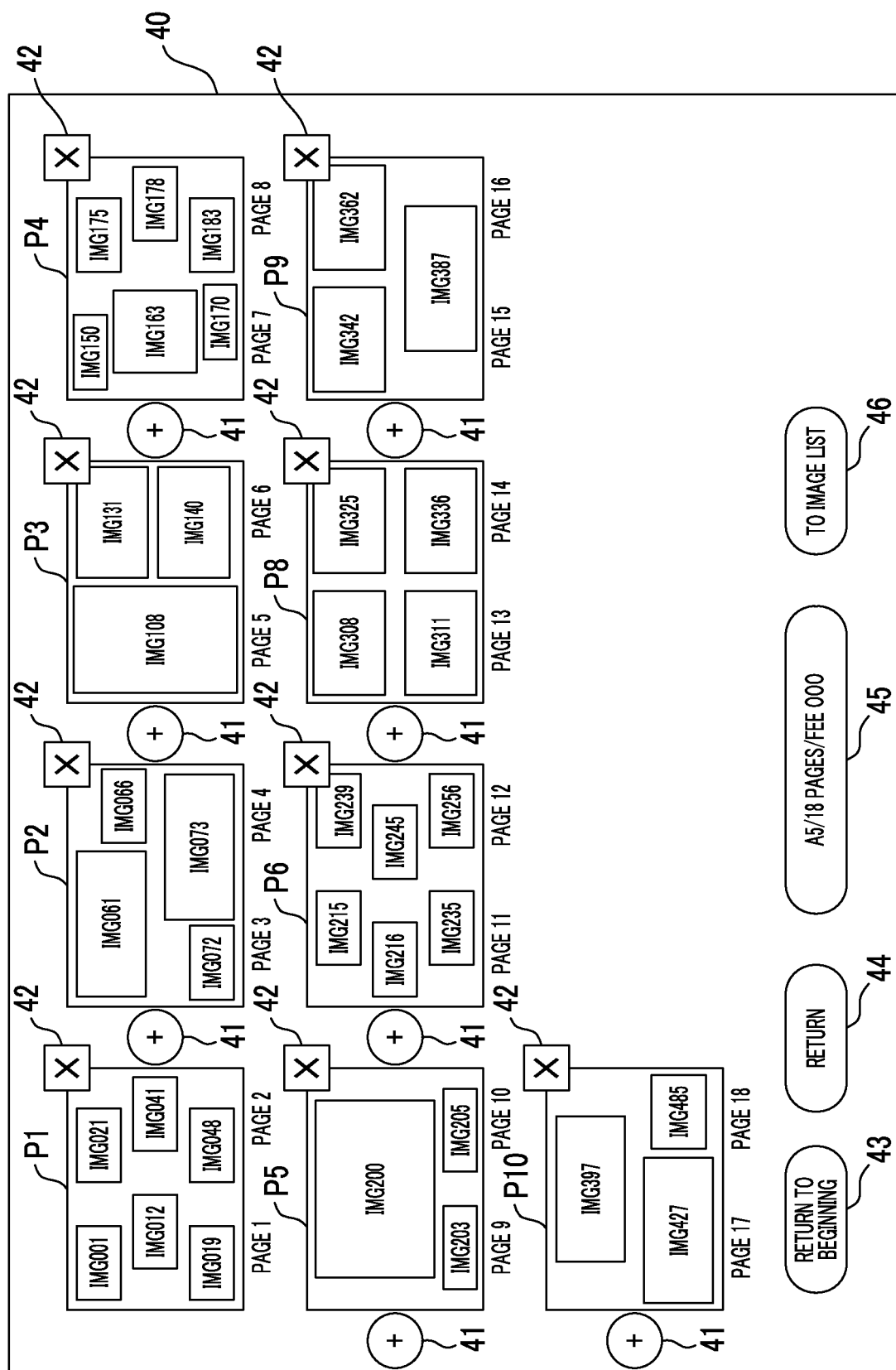
FIG. 9 is an example of a page image list window.

It is assumed that the page image addition instruction region 41 is not clicked (NO in step 29) and the page image deletion instruction region 42 corresponding to the page image P7 is clicked (YES in step 34). Then, as shown in FIG. 9, the page image P7 is deleted from the page image list window 40, and the page image P8 is displayed on the right of the page image P6. In this manner, the page image P7 is deleted from the display screen of the display device 10 by the CPU 2 (page image deletion control unit).

In the album information display region 45, since the number of pages of the album decreased due to the deletion of the page image PA, the reduced number of pages is displayed. In a case where the fee is changed by the deletion of the page image PA, the changed due is displayed in the album information display region 45.

Similarly, even in a case where the page image is deleted after the new page image PA is added, the page image corresponding to the clicked page image deletion instruction region 42 is deleted.

According to the first embodiment, since an image included in a scene assigned to one of two page images between which a new page image is interposed is pasted on the new page image, the new page image also follows the flow of the two page images.

Second Embodiment

Figure 10:
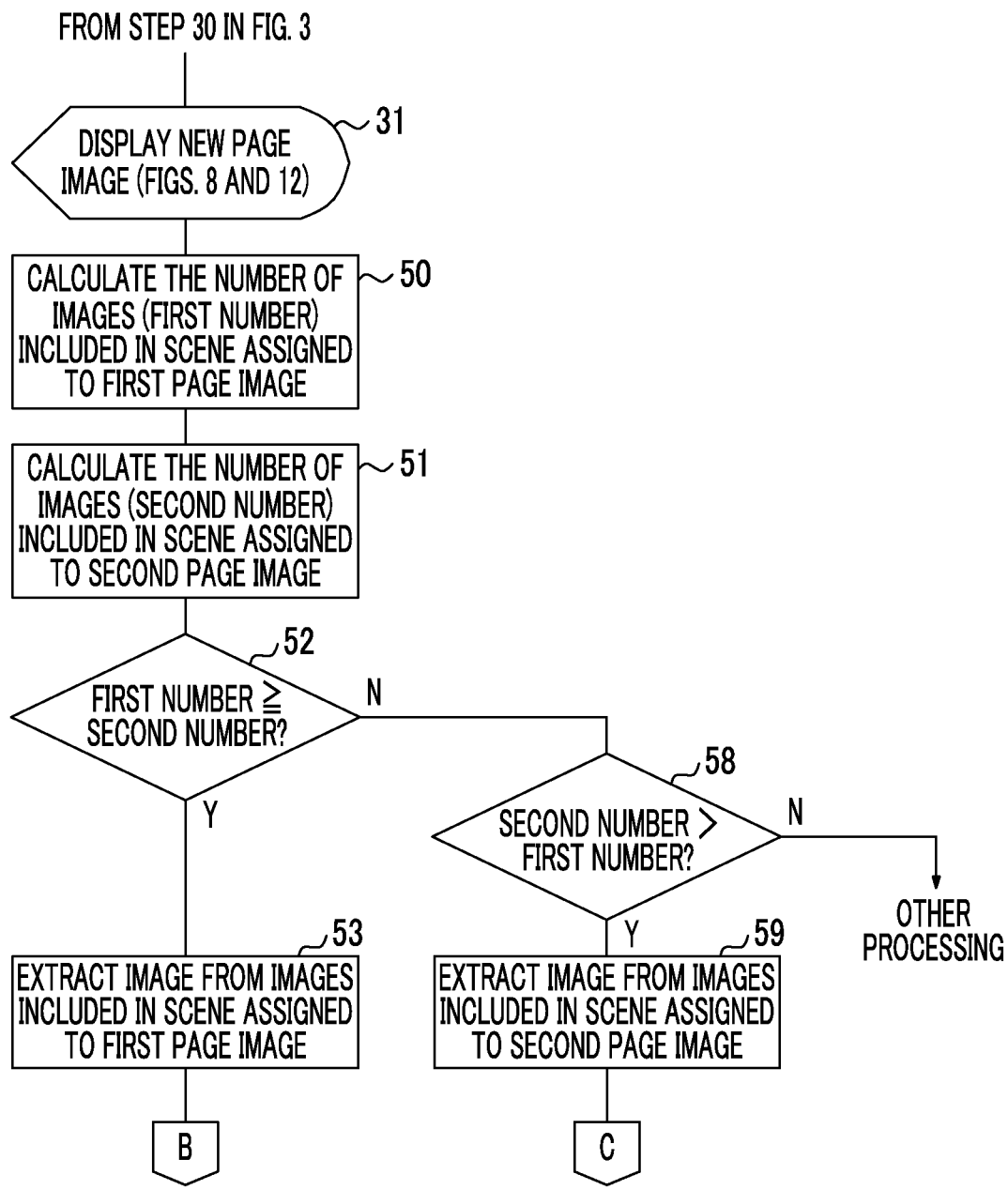
FIG. 10 is a flowchart showing the processing procedure of the page image display control system.
Figure 11:
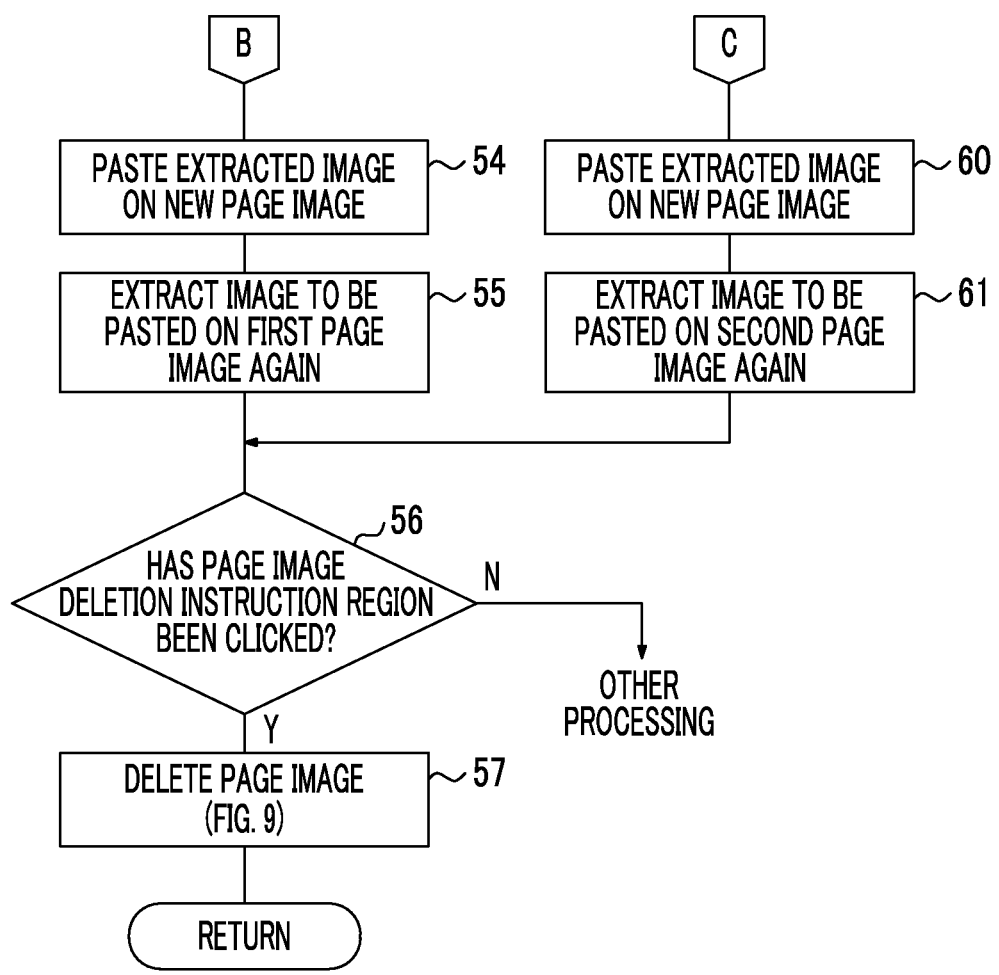
FIG. 11 is a flowchart showing the processing procedure of the page image display control system.
Figure 12:
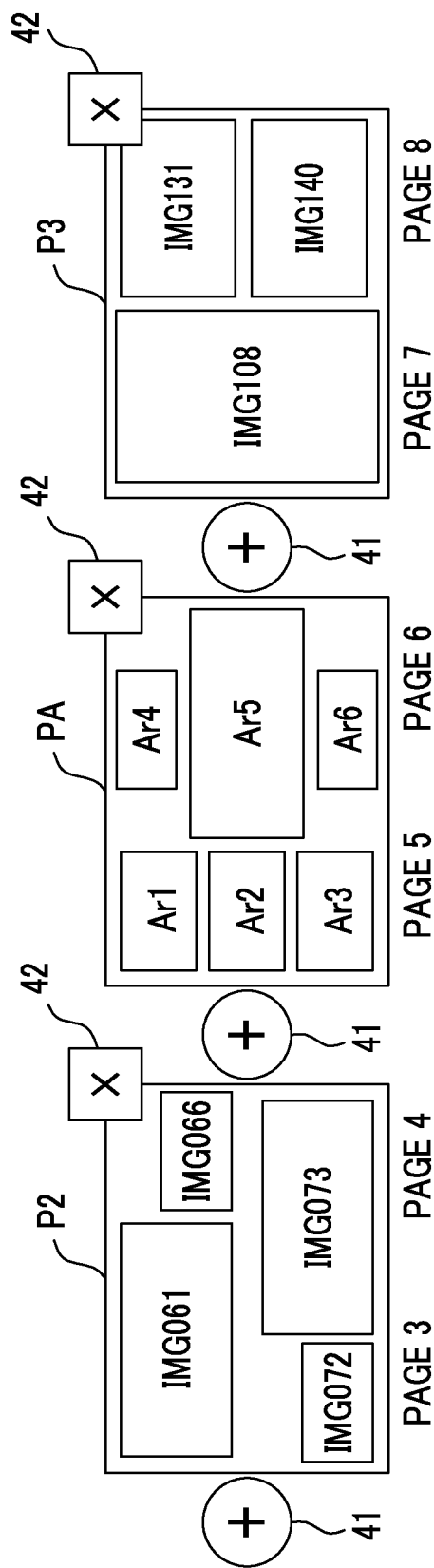
FIG. 12 is an example of a page image.

FIGS. 10 to 12 show a second embodiment.

In the present embodiment, in a case where the new page image PA is added as described above, an image extracted from a scene having a larger number of images between the number of images, which are included in a scene assigned to the first page image (in the above case, the page image P2) included in two page images between which the new page image is interposed, and the number of images, which are included in a scene assigned to the second page image (in the above case, the page image P3) included in the two page images, is displayed in the new page image PA.

FIGS. 10 and 11 are flowcharts showing a part of the processing procedure of the page image display control system 1. After the processing from step 21 in FIG. 2 to step 30 in FIG. 3, step 31 in FIG. 10 continues.

FIG. 12 shows some page images P2, PA, and P3 among the page images and the like included in the page image list window 40 in FIG. 8. As described above, the new page image PA is displayed between the page image P2 and the page image P3.

As described above, in a case where the new page image PA is displayed (step 31), the number of images (first number) included in a scene assigned to the first page image P2 between the two page images P2 and P3, between which the new page image PA is interposed, is calculated by the CPU 2 (step 50). The scene assigned to the first page image is a scene S3, and the number of images (first number) included in the scene S3 is equal to the number of image file names IMG055 to IMG084, that is, 30. Similarly, the number of images (second number) included in a scene assigned to the second page image P3 between the two page images P2 and P3, between which the new page image PA is interposed, is calculated by the CPU 2 (step 51). The scenes assigned to the second page image P3 are a scene S4 and a scene S5. The number of images included in the scene S4 is 22 that is equal to the number of image file names IMG085 to IMG0106, and the number of images included in the scene S5 is 42 that is equal to the number of image file names IMG107 to IMG148. The number of images (second number) included in the scenes S4 and S5 assigned to the second page image P3 is 64.

The first number and the second number calculated as described above are compared with each other by the CPU 2. In a case where the first number is equal to or greater than the second number (YES in step 52), an image is extracted from the images included in the scene S3 assigned to the first page image P2 by the CPU 2 (step 53). The extracted image is pasted on the image pasting regions Ar1 to Ar6 of the new page image PA by the CPU 2 (step 54 in FIG. 11).

In a case where the image included in the scene S3 assigned to the first page image P2 is pasted on the new page image PA, the extraction of an image to be pasted on the first page image P2 is performed again by the CPU 2 (step 55). This is because it is necessary to unify images to be pasted and to prevent similar images from being pasted since both the image to be pasted on the first page image P2 and the image to be pasted on the new page image PA are images included in the scene S3. The new page image PA and the first page image P2 may be regarded as one page image, and images to be pasted on the page images PA and P2 may be simultaneously extracted from the images included in the scene S3.

In a case where the second number is larger than the first number (YES in step 58), an image is extracted from the images included in the scene S4 or the scene S5 assigned to the second page image P3 by the CPU 2 (step 59). The extracted image is pasted on the image pasting regions Ar1 to Ar6 of the new page image PA by the CPU 2 (step 60 in FIG. 11).

In a case where the image included in the scene S4 or the scene S5 assigned to the first page image P2 is pasted on the new page image PA, the extraction of an image to be pasted on the second page image P3 is performed again by the CPU 2 (step 61). This is because it is necessary to unify images to be pasted and to prevent similar images from being pasted since both the image to be pasted on the second page image P3 and the image to be pasted on the new page image PA are images included in the scene S4 or the scene S5. The new page image PA and the second page image P3 may be regarded as one page image, and images to be pasted on the page images PA and P3 may be simultaneously extracted from the images included in the scene S4 or the scene S5.

In a case where the page image deletion instruction region 42 is clicked (YES in step 56), a page image corresponding to the clicked page image deletion instruction region 42 is deleted (step 57).

According to the second embodiment, an image extracted from a scene having a larger number of images between the number of images, which are included in a scene assigned to the first page image included in two page images, and the number of images, which are included in a scene assigned to the second page image included in the two page images, is pasted on the new page image. Since a scene included in a large number of images is considered to be an important scene, images of the important scene are pasted on the new page image.

Third Embodiment

Figure 13:
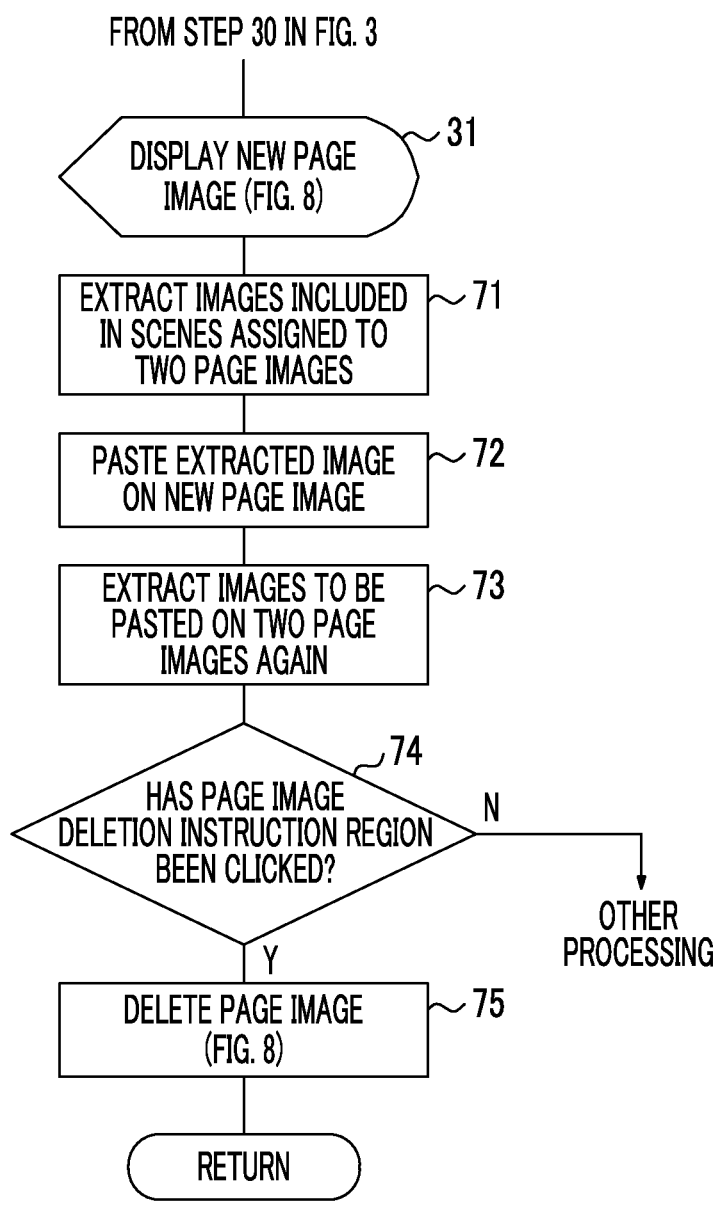
FIG. 13 is a flowchart showing the processing procedure of the page image display control system.

FIG. 13 shows a third embodiment, and is a flowchart showing a part of the processing procedure of the page image display control system 1. The processing shown in FIG. 13 is also performed subsequent to the processing of step 21 in FIG. 2 to step 30 in FIG. 3.

As shown in FIG. 12 that is enlarged compared with FIG. 8, in a case where the page image addition instruction region 41 between the page image P2 and the page image P3 is clicked, the new page image PA is displayed between the two page images P2 and P3 (step 31).

In order to paste an image on the new page image PA, images included in the scenes assigned to the two page images P2 and P3, between which the clicked page image addition instruction region 41 is interposed, are extracted by the CPU 2 (step 71). Since the scene S3 is assigned to the page image P2 and the scenes S4 and S5 are assigned to the page image P3, images included in the scenes S4, S5, and S6 are extracted by the CPU 2. The quality, brightness, and the like of images are evaluated, an image having a high evaluation value (image evaluation value) and a main subject included in the image are detected, the quality, brightness, position, and the like of the main subject are evaluated, and an image having a high evaluation value (subject evaluation value), an image with no bias in imaging date and time, and the like are extracted. However, as long as an image included in a scene assigned to at least one of the page image P2 or the page image P3, between which the clicked page image addition instruction region 41 is interposed, is extracted, image extraction based on any kind of extraction algorithm may be performed. Between the two page images P2 and P3 between which the clicked page image addition instruction region 41 is interposed, an image included in either the scene S3 or the scenes S4 and S5 assigned to the page image P2 or the page image P3 may be extracted and be pasted on a new page image. Although a plurality of scenes S4 and S5 are assigned to one page image P3 between the two page images P2 and P3 between which the clicked page image addition instruction region 41 is interposed, images may be extracted from both the plurality of scenes S4 and S5, or an image may be extracted from one of the plurality of scenes S4 and S5.

In a case where the image is extracted, the extracted image is pasted on the new page image PA by the CPU 2 (step 72).

Then, due to the addition of the new page image PA, extraction of images to be pasted on the two page images P2 and P3, between which the clicked page image addition instruction region 41 is interposed, is performed again by the CPU 2 (step 73). Since the scene S3 is assigned to the page image P2, an image is extracted from the images included in the scene S3, and the extracted image is newly pasted on the page image P2. It is needless to say that the image already pasted on the page image P2 is eliminated. Since the scenes S4 and S5 are assigned to the page image P3, an image is extracted from the images included in the scene S4 or S5, and the extracted image is newly pasted on the page image P3. However, extraction of images to be pasted on the two page images P2 and P3, between which the clicked page image addition instruction region 41 is interposed, may not be performed again.

In a case where the page image deletion instruction region 42 is clicked by the user (YES in step 74), a page image corresponding to the clicked page image deletion instruction region 42 is deleted by the CPU 2 (step 75).

According to the third embodiment, since images included in scenes assigned to two page images between which a new page image is interposed are pasted on the new page image, interruption of the flow of images is prevented.

Fourth Embodiment

Figure 14:
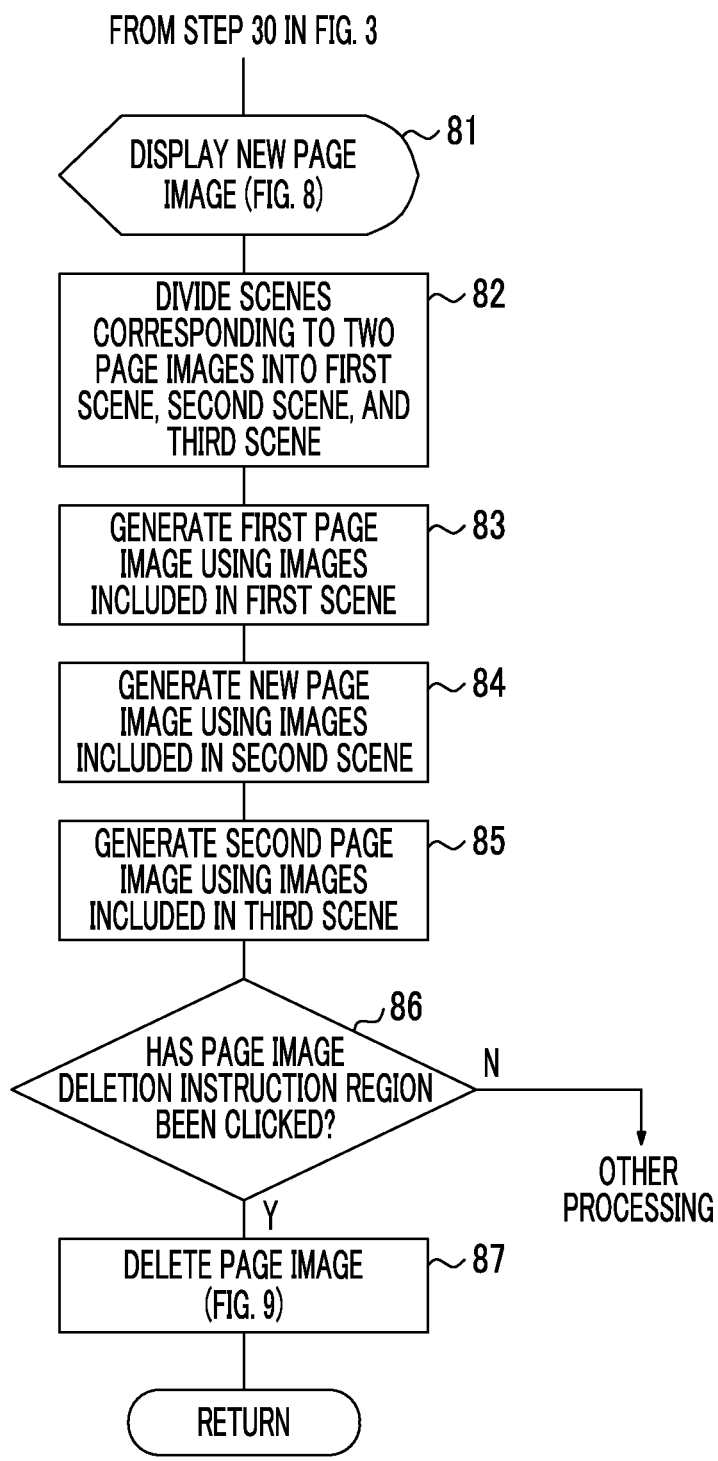
FIG. 14 is a flowchart showing the processing procedure of the page image display control system.
Figure 15:
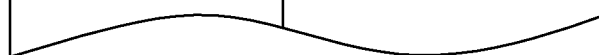
FIG. 15 is an example of a page image table.

FIGS. 14 and 15 show a fourth embodiment.

FIG. 14 is a flowchart showing a part of the processing procedure of the page image display control system 1. The processing shown in FIG. 14 is also performed subsequent to the processing of step 21 in FIG. 2 to step 30 in FIG. 3.

As shown in FIG. 12 that is enlarged compared with FIG. 8, in a case where the page image addition instruction region 41 between the page image P2 and the page image P3 is clicked, the new page image PA is displayed between the two page images P2 and P3 (step 81).

Then, the scene assigned to the first page image P2 included in the two page images and the scene assigned to the second page image P3 included in the two page images are divided into a first scene, a second scene, and a third scene by the CPU 2 so as to correspond to the first page image P2, the new page image PA, and the second page image P3, respectively (step 82). Since the scene S3 is assigned to the first page image P2 and the scenes S4 and S5 are assigned to the second page image P3, the scenes are divided into the three scenes S3, S4, and S5. Among the three scenes S3, S4, and S5, the scene S3 is assigned to the first page image P2 as the first scene, the scene S4 is assigned to the new page image PA as the second scene, and the scene S5 is assigned to the second page image P3 as the third scene. In this manner, scenes assigned to respective page images are changed.

FIG. 15 shows an example of a page image table in which assigned scenes have been changed.

The scene S3, the scene S4, and the scene S5 are assigned to the page image P2, the page image PA, and the page image P3 as the first scene, the second scene, and the third scene, respectively.

Referring back to FIG. 14, the first page image P2 is generated using the images included in the scene S3 (first scene) assigned to the first page image P2 (image extracted from the images included in the scene S3 assigned to the first page image P2 is pasted) (step 83). Similarly, the new page image PA is generated using the images included in the scene S4 (second scene) assigned to the new page image PA (image extracted from the images included in the scene S4 assigned to the new page image PA is pasted) (step 84), and the second page image P3 is generated using the images included in the scene S5 assigned to the second page image P3 (image extracted from the images included in the scene S5 assigned to the second page image P3 is pasted) (step 85).

In a case where the page image deletion instruction region 42 is clicked by the user (YES in step 86), a page image corresponding to the clicked page image deletion instruction region 42 is deleted by the CPU 2 (step 87).

According to the fourth embodiment, since a new page image or the like is generated by being divided into the first scene, the second scene, and the third scene, a new page image or the like along the flow of scenes is generated.

Fifth Embodiment

Figure 16:
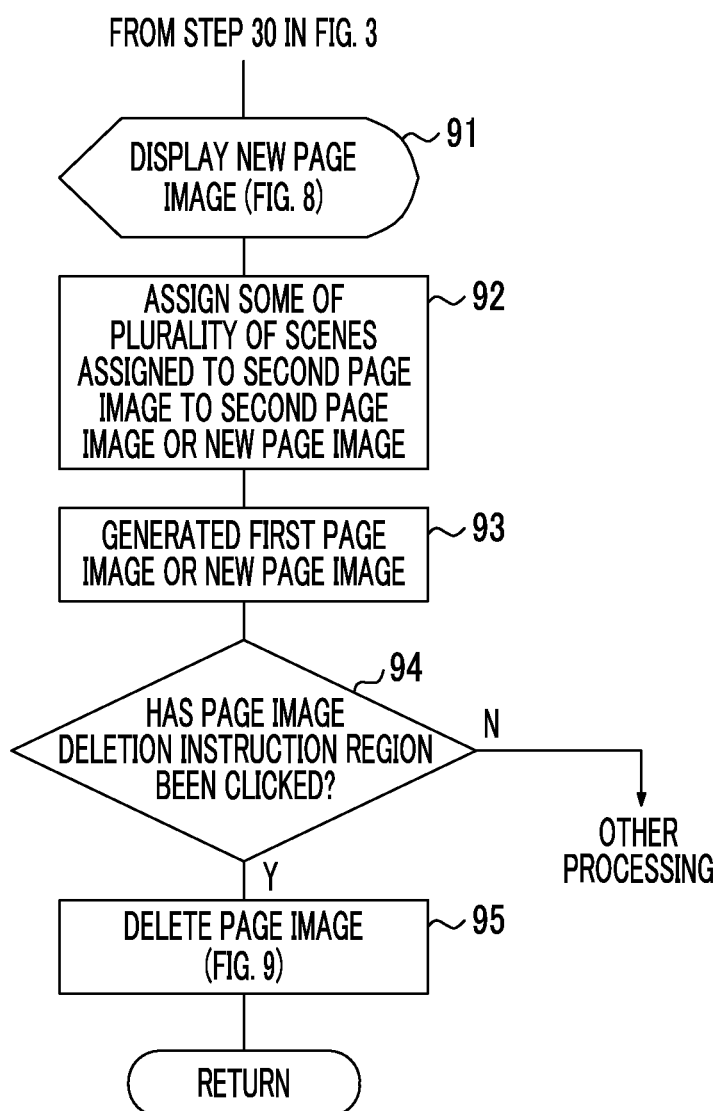
FIG. 16 is a flowchart showing the processing procedure of the page image display control system.

FIG. 16 shows a fifth embodiment, and is a flowchart showing a part of the processing procedure of the page image display control system 1. The processing shown in FIG. 16 is also performed subsequent to the processing of step 21 in FIG. 2 to step 30 in FIG. 3.

As shown in FIG. 12 that is enlarged compared with FIG. 8, in a case where the page image addition instruction region 41 between the page image P2 and the page image P3 is clicked, the new page image PA is displayed between the two page images P2 and P3 (step 91).

As shown in FIG. 6, one scene S3 is assigned to the first page image P2 included in the two page images P2 and P3, and two (a plurality of) scenes S4 and S5 are assigned to the second page image P3 included in the two page images P2 and P3. Since a plurality of scenes S4 and S5 are assigned to the second page image P3, some of the plurality of scenes are assigned to the second page image or the new page image by the CPU 2 (step 92). For example, the scene S4 is assigned to the new page image PA, and the scene S5 is assigned to the second page image. The new page image PA is generated by the CPU 2 using the image included in the scene S4 assigned to the new page image PA, and the second page image P2 is generated by the CPU 2 using the image included in the scene S5 assigned to the second page image P2 (step 93).

In a case where the page image deletion instruction region 42 is clicked by the user (YES in step 94), a page image corresponding to the clicked page image deletion instruction region 42 is deleted by the CPU 2 (step 95).

In the above-described embodiment, some of the plurality of scenes S4 and S5 assigned to the second page image P2 included in the two page images P2 and P3 are assigned to the second page image P2 or the new page image PA, and the second page image P2 or the new page image PA is generated using the image included in each assigned scene. However, in a case where a plurality of scenes are assigned to the first page image P2 included in the two page images P2 and P3, some of the plurality of assigned scenes may be assigned to the first page image P2 or the new page image PA, and the first page image P2 or the new page image PA may be generated using the image included in each assigned scene. In addition, some of the plurality of scenes S3, S4, and S5 assigned to the two page images P2 and P3 may be assigned to the first page image P2, the second page image P3, or the new page image PA, and the first page image P2, the second page image P3, or the new page image PA may be generated using the image included in each assigned scene.

According to the fifth embodiment, since some of a plurality of scenes assigned to the first page image or the like included in two page images, between which a new page image is interposed, are assigned to the new page image or the like, a change in scenes is prevented.

Sixth Embodiment

Figure 17:
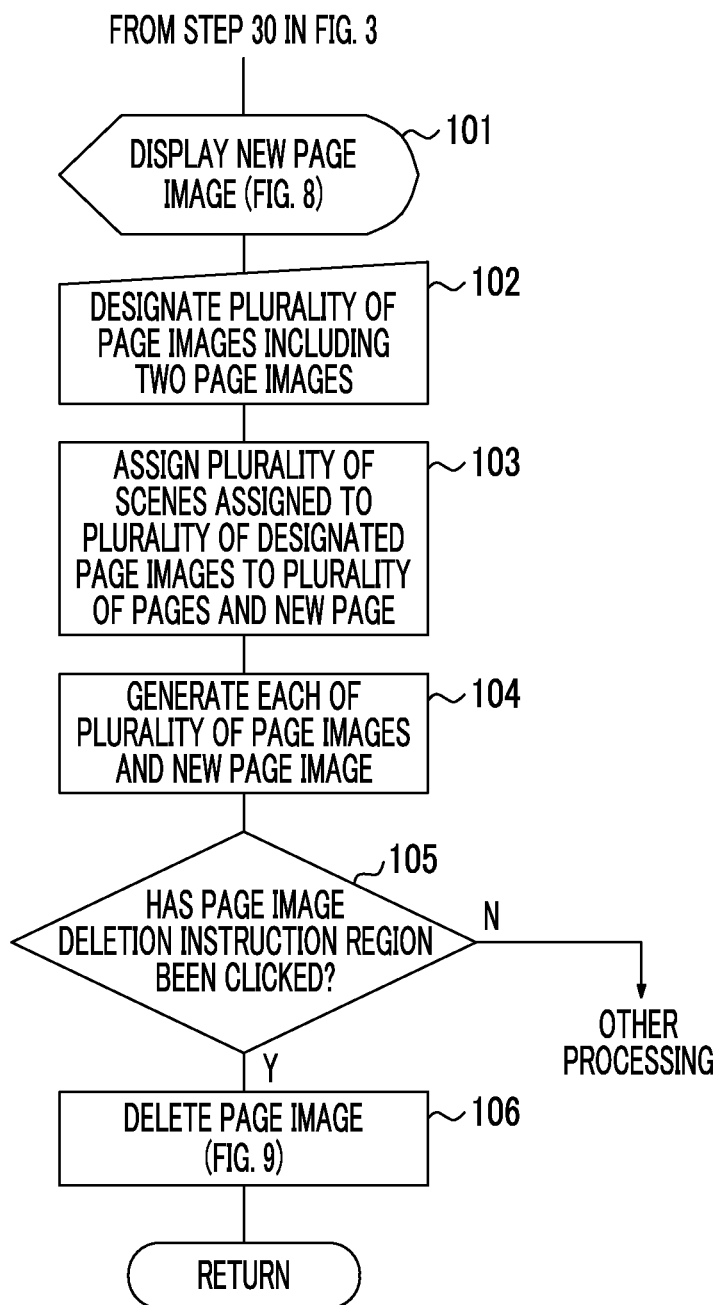
FIG. 17 is a flowchart showing the processing procedure of the page image display control system.

FIGS. 17 and 18 show a sixth embodiment.

FIG. 17 is a flowchart showing a part of the processing procedure of the page image display control system 1. The processing shown in FIG. 17 is also performed subsequent to the processing of step 21 in FIG. 2 to step 30 in FIG. 3.

As shown in FIG. 12 that is enlarged compared with FIG. 8, in a case where the page image addition instruction region 41 between the page image P2 and the page image P3 is clicked, the new page image PA is displayed between the two page images P2 and P3 (step 101).

In the present embodiment, a plurality of page images including the two page images P2 and P3, between which the clicked page image addition instruction region 41 is interposed, are designated by the user using the mouse 4 (page image designation unit) (step 102). Then, a plurality of scenes assigned to the plurality of designated page images are assigned to a plurality of pages and a new page by the CPU 2 (scene assignment unit) (step 103).

Referring to FIG. 8, it is assumed that the page images P1, P2, P3, and P4 are designated as a plurality of pages, for example. As shown in FIG. 6, the scenes S1 and S2 are assigned to the page image P1, the scene S3 is assigned to the page image P2, the scenes S4 and S5 are assigned to the page image P3, and the scene S6 is assigned to the page image P4. The scenes S1 to S6 are assigned to the plurality of designated page images P1, P2, P3, and P4 and the new page image PA by the CPU 2. For example, the scene S1 is assigned to the page image P1, the scene S2 is assigned to the page image P2, the scene S3 is assigned to the page image PA, the scenes S4 and S5 are assigned to the page image P3, and the scene S6 is assigned to the page image P4.

FIG. 18 shows an example of a page image table in which assignment has been changed.

The scenes newly assigned as described above are stored corresponding to the page images.

Referring back to FIG. 17, the plurality of page images P1, P2, P3, and P4 and the new page image PA are generated by the CPU 2 using images included in the newly assigned scenes (step 104). Since the scene newly assigned to the page image P1 is the scene 51, an image extracted from the images included in the scene 51 is pasted on the page image P1, so that the page image P1 is newly generated. Similarly, since the scene newly assigned to the page image P2 is the scene S2, an image extracted from the images included in the scene S2 is pasted on the page image P2, so that the page image P2 is newly generated. Since the scene assigned to the new page image PA is the scene S3, an image extracted from the images included in the scene S3 is pasted on the new page image PA, so that the new page image PA is generated. In addition, since the scenes newly assigned to the page image P3 are the scenes S4 and S5, an image extracted from the images included in the scene S4 or S5 is pasted on the page image P3, so that the page image P3 is newly generated. Since the scene newly assigned to the page image P4 is the scene S6, an image extracted from the images included in the scene S6 is pasted on the page image P6, so that the page image P6 is newly generated.

In a case where the page image deletion instruction region 42 is clicked by the user (YES in step 105), a page image corresponding to the clicked page image deletion instruction region 42 is deleted by the CPU 2 (step 106).

According to the sixth embodiment, a plurality of page images are designated, and scenes assigned to the plurality of designated page images are reassigned in a new page image and the plurality of designated page images. Therefore, even if a new page image is added, an abrupt change in the scenes assigned to the plurality of designated page images is prevented.

Seventh Embodiment

FIGS. 19 to 23 show a seventh embodiment.

In the present embodiment, a plurality of images are displayed in different regions for each scene.

Figure 19:
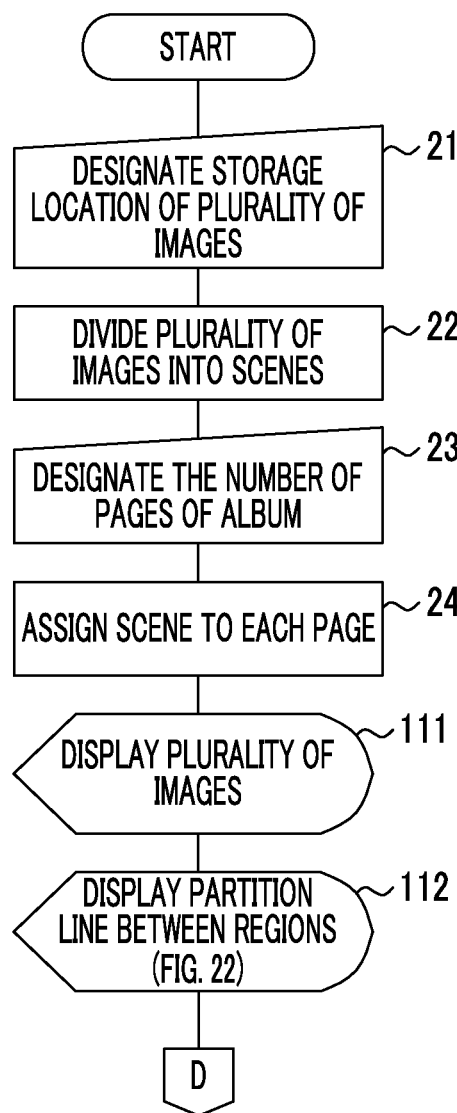
FIG. 19 is a flowchart showing the processing procedure of the page image display control system.
Figure 20:
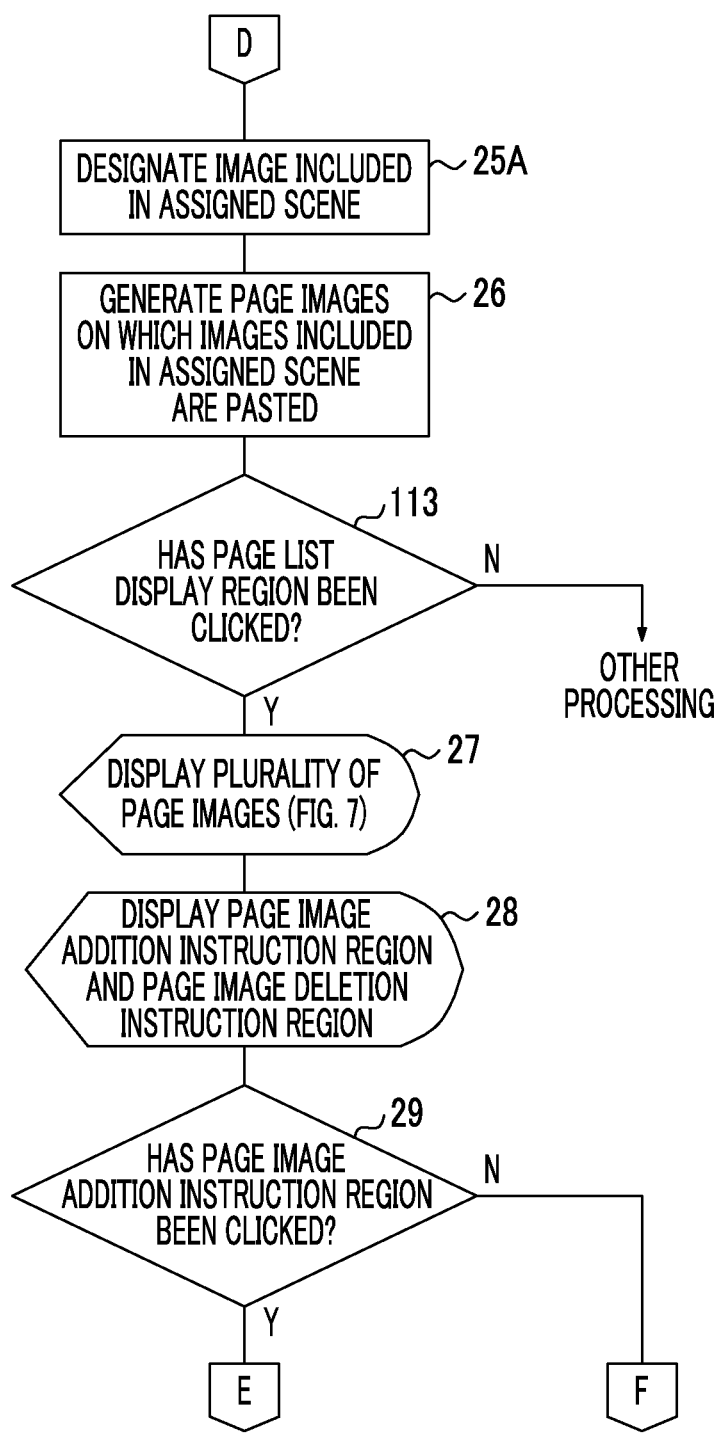
FIG. 20 is a flowchart showing the processing procedure of the page image display control system.
Figure 21:
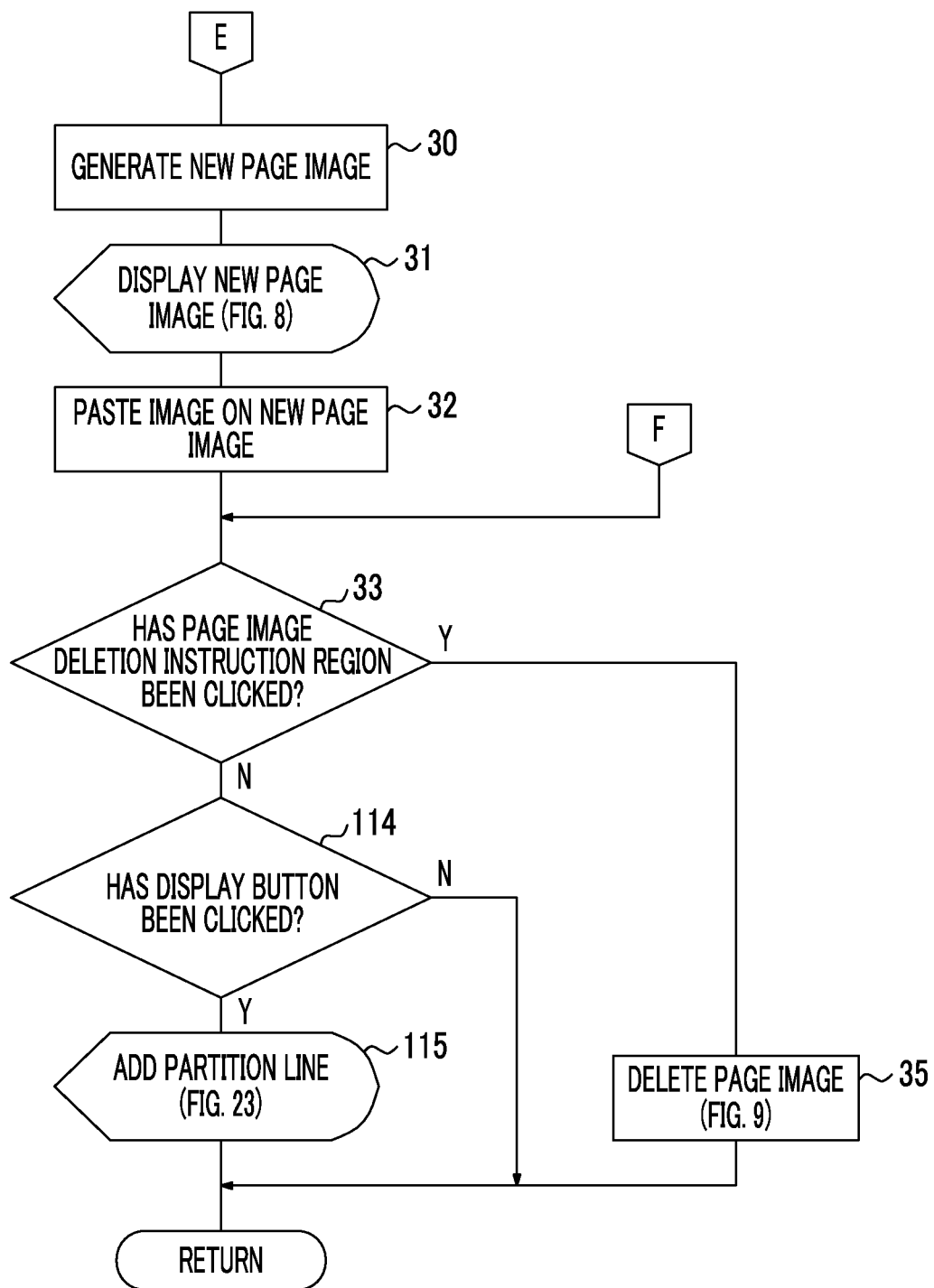
FIG. 21 is a flowchart showing the processing procedure of the page image display control system.

FIGS. 19 and 21 are flowcharts showing the processing procedure of the page image display control system 1. FIGS. 19 to 21 correspond to the flowcharts shown in FIGS. 2 and 3, and the same processes as those shown in FIG. 2 or 3 are denoted by the same reference numerals.

A storage location of a plurality of images is designated by the user using the mouse 4 or the like (step 21), and the plurality of images stored in the designated storage location are divided into a plurality of scenes by the CPU 2 (step 22). The number of pages of the album is designated by the user (step 23), and a scene is assigned for each number of pages (step 24). Also in the present embodiment, it is assumed that the memory card 12 in which 500 image files are stored is designated as an image storage location as described with reference to FIGS. 2 and 3 and scenes are assigned to the page images P1 to P10 as described with reference to FIGS. 5 and 6.

The plurality of image files stored in the storage location designated by the user are read by the CPU 2, and a plurality of images (thumbnail images) represented by the plurality of read image files are displayed on the display screen of the display device 10 by the display control device 9 (image display control unit) (step 111).

Figure 22:
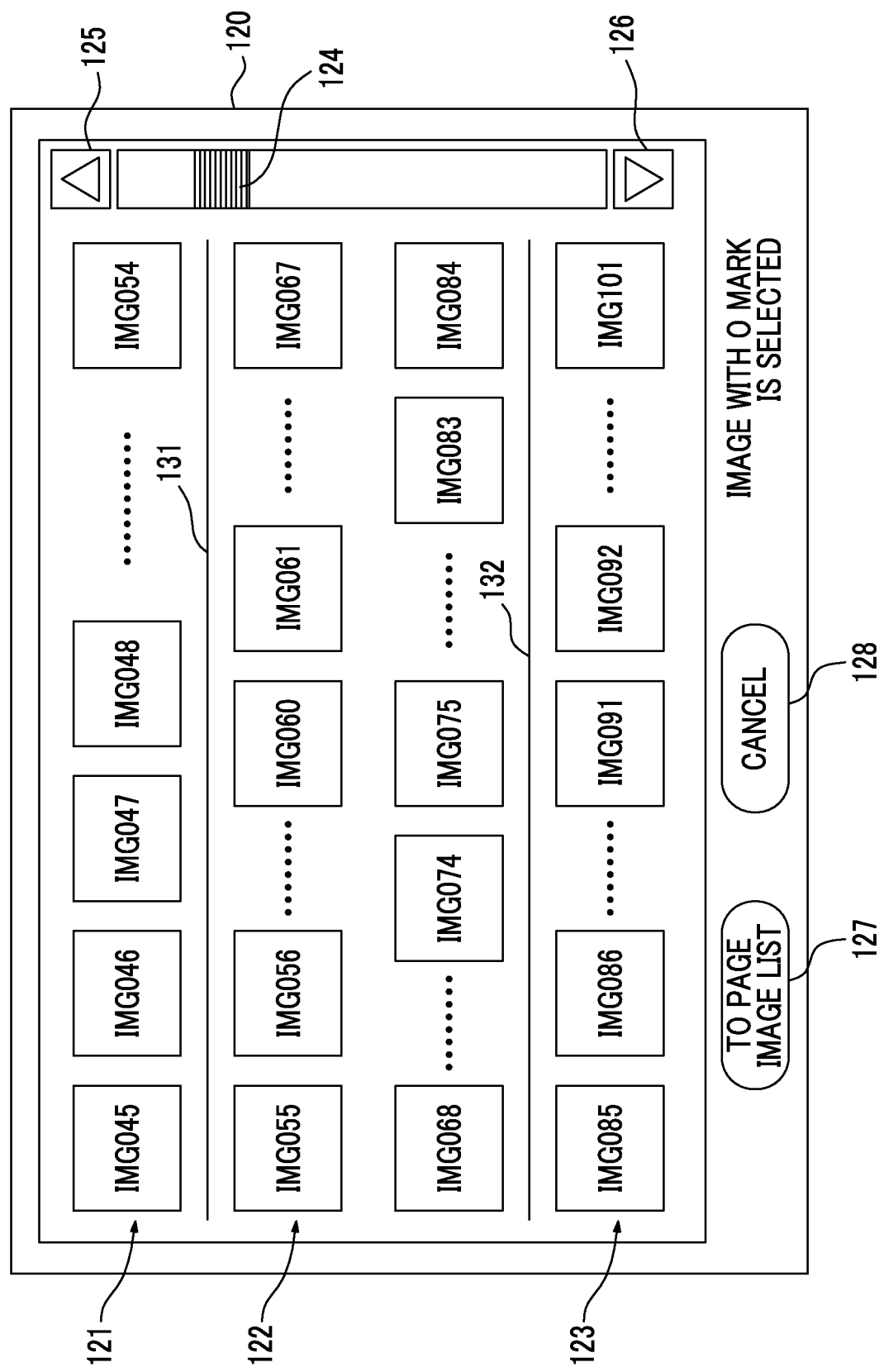
FIG. 22 is an example of an image list window.

FIG. 22 shows an example of an image list window 120 displayed on the display screen of the display device 10.

The image list window 120 includes a plurality of regions 121, 122, and 123. Images included in the scene S3 assigned to the page corresponding to the page image P2 (images represented by image file names IMG022 to IMG054) are displayed in the region 121. Images included in the scenes S4 and S5 assigned to the page corresponding to the page image P3 (images represented by image file names IMG055 to IMG084) are displayed in the region 122. Images included in the scene S6 assigned to the page corresponding to the page image P4 (images represented by image file names IMG085 to IMG148) are displayed in the region 123. In FIG. 22, for the sake of clarity, the displayed images are represented by the file names. Between the regions 121 and 122, a partition line 131 that partitions off the regions 121 and 122 is displayed on the display screen of the display device 10 by the display control device 9 (partition line display control unit) (step 112). Similarly, between the regions 122 and 123, a partition line 132 that partitions off the regions 122 and 123 is displayed on the display screen of the display device 10 by the display control device 9 (partition line display control unit).

An up arrow button 125, a scroll button 124, and a down arrow button 126 are displayed on the right side of the image list window 120. In a case where the up arrow button 125 is clicked by the mouse 4 or the scroll button 124 is dragged upward by the mouse 4, the regions 121, 122, and 123 displayed in the image list window 120 are moved downward as a whole by the display control device 9. The images included in the scenes S1 and S2 assigned to the page image P1 before the page image P2 are partitioned by the partition line and displayed in a region different from the region 121. In a case where the down arrow button 126 is clicked by the mouse 4 or the scroll button 124 is dragged downward by the mouse 4, the regions 121, 122, and 123 displayed in the image list window 120 are moved upward as a whole by the display control device 9. The images included in the scene S8 and the like assigned to the page image P6 and the like before the page image P5 are partitioned by the partition line and displayed in a region different from the region 123.

The user can designate a desired image, among a plurality of images displayed in the image list window 120, using the mouse 4, and the designated image is pasted on the corresponding page image. For example, in a case where the user designates images represented by image file names IMG061, IMG066, IMG072, and IMG073 among the images (images included in the scenes S4 and S5 assigned to the page corresponding to the page image P3 and images represented by image file names IMG055 to IMG084) displayed in the region 122, the images represented by the image file names IMG061, IMG066, IMG072, and IMG073 are pasted on the page image P2 by the CPU 2 as shown in FIG. 7. This is the same for the regions 121 and 123 and a region that is not displayed in the image list window 120.

A page list display region 127 where characters "to page image list" are displayed and a cancel button 128 where characters "cancel" are displayed are displayed in a lower portion of the image list window 120. In a case where the page list display region 127 is clicked, the page image list window 40 is displayed on the display screen of the display device 10 as shown in FIG. 7.

As described above, in a case where the user designates a desired image among the images displayed separately for each region, an image included in the assigned scene is designated (step 25A in FIG. 20). However, images included in the assigned scene may be extracted by the CPU 2 without designation by the user. Subsequently, a plurality of page images, in which images included in the assigned scene are pasted on the mount image, are generated by the CPU 2 (page image generation unit) (step 26).

In a case where the page list display region 127 is clicked by the user (YES in step 113), the page image list window 40 is displayed on the display screen of the display device 10 by the display control device 9 (first page image display control unit), as shown in FIG. 7. As a result, a plurality of page images P1 to P10 are displayed on the display screen of the display device 10 (step 27). In the page image list window 40, as described above, the page image addition instruction region 41 is displayed between the page images P1 to P10, and the page image deletion instruction region 42 is displayed corresponding to each of the page images P1 to P10 (step 28).

In a case where the page image addition instruction region 41 is clicked (YES in step 29), a new page image is generated by the CPU 2 (step 30 in FIG. 21), and the generated new page image is displayed between two page images between which the clicked page image addition instruction region 41 is interposed (step 31). Images are pasted on the new page image as described above (step 32).

In a case where the page image deletion instruction region 42 is clicked (YES in step 33), a page image corresponding to the clicked page image deletion instruction region 42 is deleted (step 35).

Figure 23:
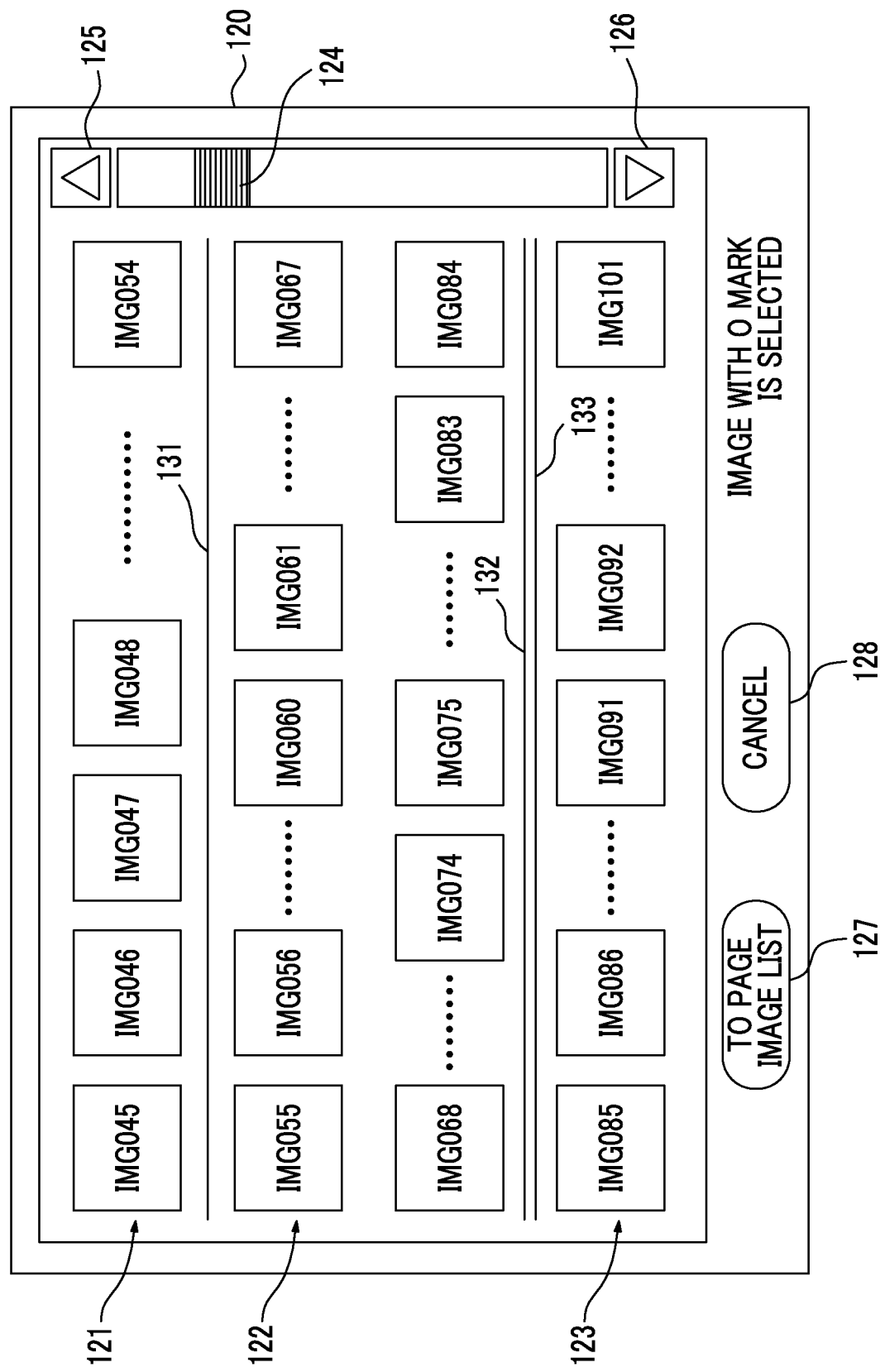
FIG. 23 is an example of an image list window.

In a case where the list display button 46 included in the page image list window 40 is clicked (YES in step 114), a new page image is added. Accordingly, a partition line that partitions off the regions corresponding to two page images (page images adjacent to the new page image), between which the added new page image is interposed, is added (step 115). For example, in a case where the new page image PA is added between the page images P2 and the page image P3, as shown in FIG. 23, a partition line 133 that partitions off the region 122 corresponding to the page image P2 and the region 123 corresponding to the page image P3 is added.

According to the seventh embodiment, since the partition line is displayed, images that can be used for a page image can be understood in a state in which the images are associated with the page image.

Eighth Embodiment

Figure 24:
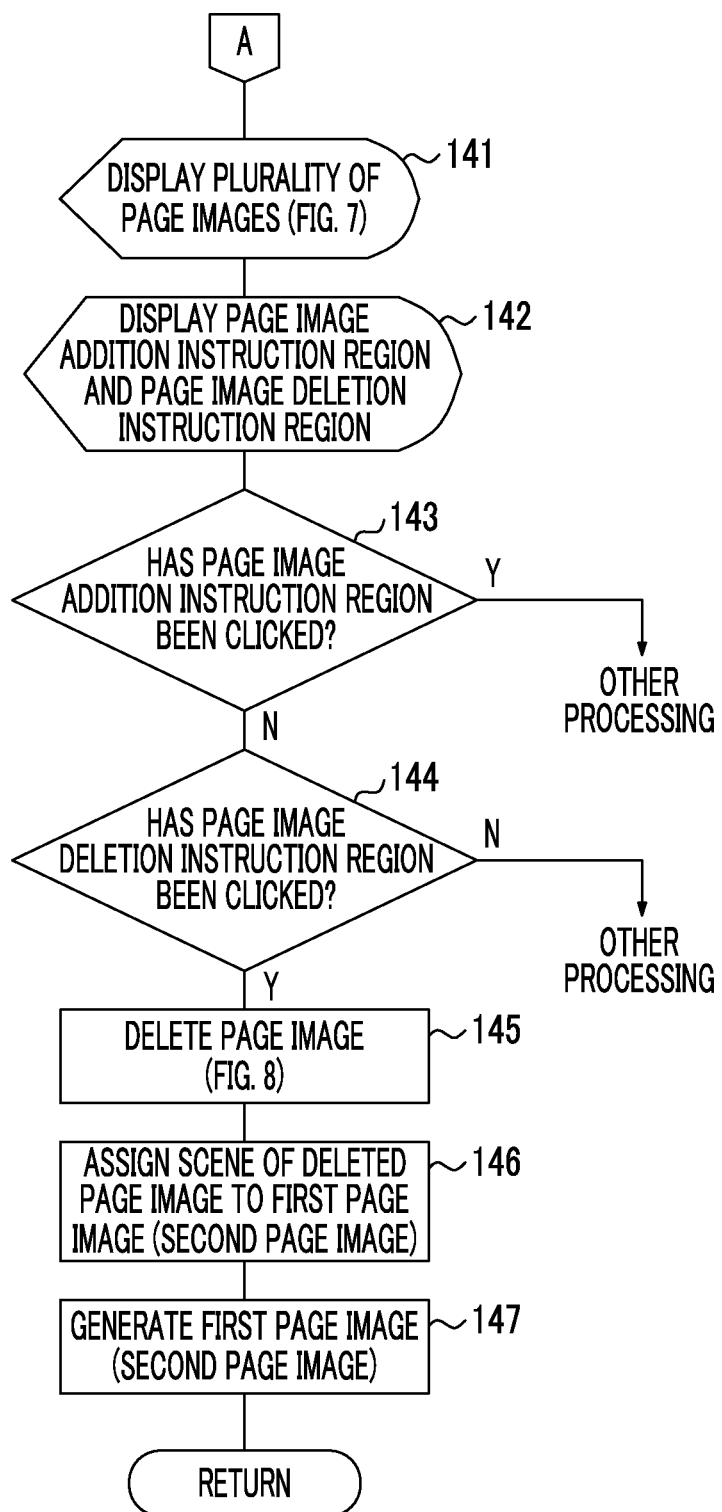
FIG. 24 is a flowchart showing the processing procedure of the page image display control system.
Figure 25:
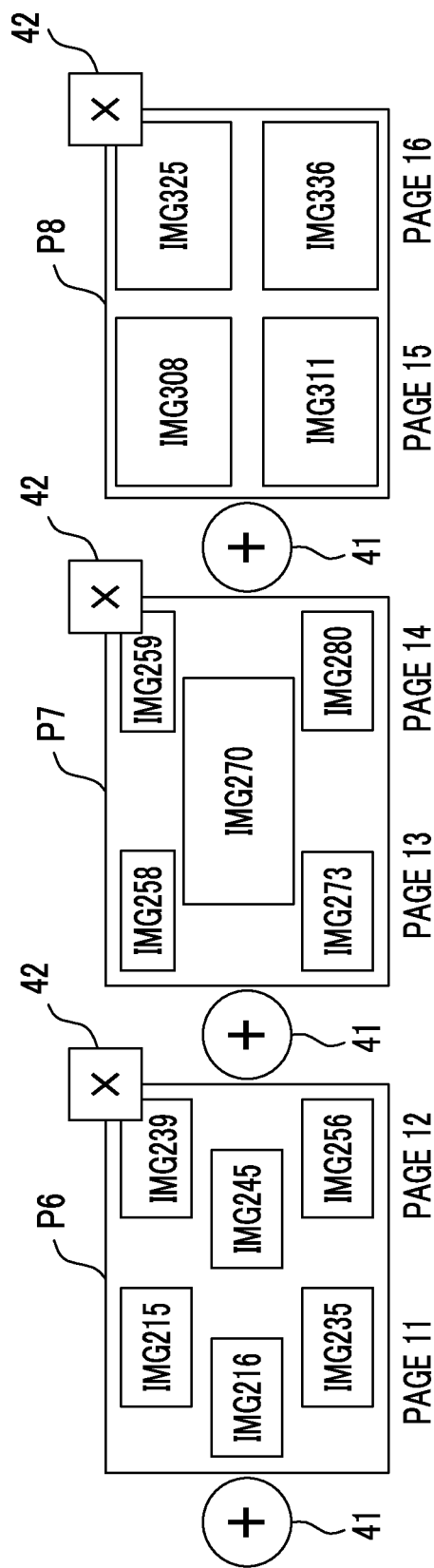
FIG. 25 is an example of a page image.

FIGS. 24 to 26 show an eighth embodiment.

FIG. 24 shows a part of the processing procedure of the page image display control system 1. The processing shown in FIG. 24 is performed subsequent to the processing of step 21 in FIG. 2 to step 30 in FIG. 3.

As shown in FIG. 7, a plurality of page images P1 to P10 are displayed (step 141), and the page image addition instruction region 41 and the page image deletion instruction region 42 are displayed (step 142).

In a case where the page image addition instruction region 41 is not clicked (NO in step 143) and the page image deletion instruction region 42 is clicked (YES in step 144) (the page image addition instruction region 41 may be clicked and the page image deletion instruction region 42 may be clicked), the page image corresponding to the clicked page image deletion instruction region 42 is deleted by the CPU 2 (step 145).

FIG. 25 shows the page images P6 to P8, among the page images P1 to P10 displayed in the page image list window 40, in an enlarged manner compared with FIG. 7.

For example, assuming that the page image deletion instruction region 42 displayed on the upper right of the page image P7 is clicked, the page image P7 is deleted.

In a case where the page image is deleted, a scene assigned to the deleted page image is additionally assigned to at least one page image of a first page image or a second page image, between which the deleted page image is interposed, by the CPU 2 (step 146). For example, assuming that the page image P7 is deleted, as shown in FIG. 25, the scene assigned to the page image P7 is added to at least one page image of the page image P6 or the page image P8, between which the page image P7 is interposed. As shown in FIG. 6, the scenes assigned to the page image P7 are the scenes S9 and S10, the scene assigned to the page image P6 is the scene S8, and the scene assigned to the page image P8 is the scene S11. In a case where the scenes assigned to the page image P7 are additionally assigned to the page image P6, as shown in FIG. 26, the scenes assigned to the page image P6 are the scenes S8, S9, and S10, and the scene assigned to the page image P8 does not change in the scene S11. In a case where the scenes assigned to the page image P7 are additionally assigned to the page image P8, the scenes assigned to the page image P8 are the scenes S9, S10, and S11, and the scene assigned to the page image P6 does not change in the scene S8. In a case where, between the scenes S9 and S10 assigned to the page image P7, the scene S9 is additionally assigned to the page image P6 and the scene S10 is additionally assigned to the page image P8, the scenes assigned to the page image P6 are the scenes S8 and S9, and the scenes assigned to the page image P8 are the scenes S10 and S11.

In a case where the scenes assigned in this manner are added, a page image to which the scenes have been added, between the first and second page images between which the deleted page image is interposed, is generated by the CPU 2 using images included in the already assigned scenes and images included in the added scene (step 147).

According to the eighth embodiment, even if a page image is deleted, it is possible to prevent an abrupt change in the scenes of two page images between which the deleted page image is interposed.

Ninth Embodiment

Figure 27:
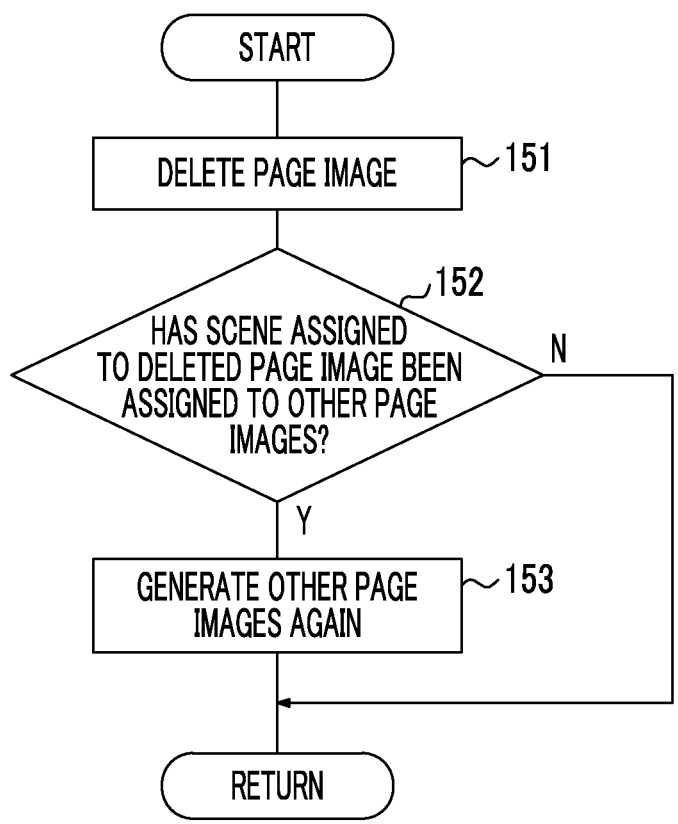
FIG. 27 is a flowchart showing the processing procedure of the page image display control system.

FIGS. 27 and 28 show a ninth embodiment.

FIG. 27 is a flowchart showing a part of the processing procedure of the page image display control system 1. This flowchart is started when the page image deletion instruction region 42 is clicked. FIG. 28 is an example of a page image table.

In a case where the page image deletion instruction region 42 is clicked, a page image corresponding to the clicked page image deletion instruction region 42 is deleted (step 151). In a case where the scene assigned to the deleted page image is assigned to page images other than the deleted page image (YES in step 152), an image included in the scene assigned to the deleted page image is extracted by the CPU 2, and another page image is generated again using the extracted image (step 153).

For example, as shown in FIG. 28, it is assumed that scenes S9 and S10 are assigned to the page image P7 and scenes S10 and S11 are assigned to the page image P8. The scene S10 is assigned to both the page image P7 and the page image P8. Assuming that the page image P7 is deleted in such a state, an image is extracted from images included in the scene S10 assigned to the deleted page image P7 by the CPU 2, and another page image P8 is generated again using the extracted image.

According to the ninth embodiment, an image is extracted from images included in a scene assigned to a deleted page image, and another page image is generated using the extracted image. Accordingly, there is a possibility that a good image will be extracted again to be pasted on another page image.

Tenth Embodiment

Figure 29:
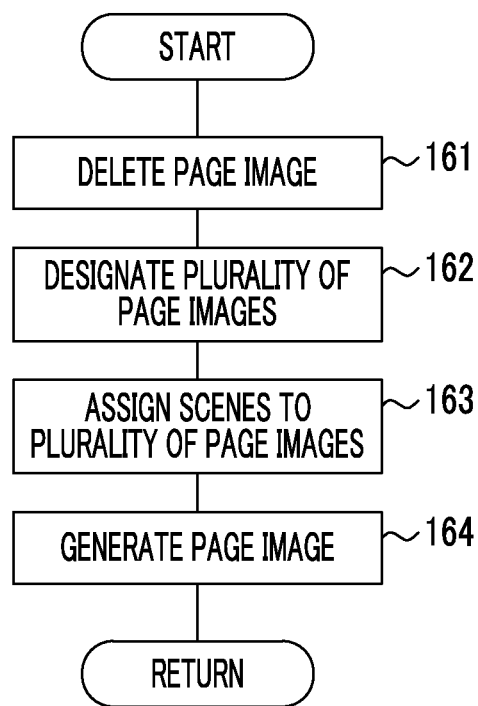
FIG. 29 is a flowchart showing the processing procedure of the page image display control system.

FIGS. 29 and 30 show a tenth embodiment.

FIG. 29 is a flowchart showing a part of the processing procedure of the page image display control system 1. This flowchart is started when the page image deletion instruction region 42 is clicked.

In a case where the page image deletion instruction region 42 is clicked, a page image corresponding to the clicked page image deletion instruction region 42 is deleted (step 161). The user designates a plurality of page images including the two page images, between which the deleted page image is interposed, using the mouse 4 (page image designation unit) (step 162). However, the CPU 2 may determine a plurality of page images without designation by the user.

Then, processing for reassigning the scene assigned to the deleted page image and the plurality of scenes assigned to the plurality of designated (determined) page images to the plurality of designated (determined) page images is performed by the CPU 2 (step 163). Using the images included in the reassigned scenes, each of the plurality of designated (determined) page images is generated by the CPU 2 (step 164).

It is assumed that the page image P7 is deleted and the page images P5, P6, P8, P9, and P10 are designated as a plurality of page images. As shown in FIG. 6, the scene S7 is assigned to the page image P5, the scene S8 is assigned to the page image P6, the scenes S9 and S10 are assigned to the page image P7, the scene S11 is assigned to the page image P8, the scene S12 is assigned to the page image P9, and the scenes S13, S14, and S15 are assigned to the page image P10. Then, the scenes S7 to S15 assigned to the page images P5 to P10 are reassigned to the plurality of page images P5, P6, P8, P9, and P10.

FIG. 30 shows an example of a page image table in which scenes have been reassigned.

Before the page image P7 is deleted, the scenes S7 to S15 assigned to the page images P5 to P10 are reassigned to the designated page images P5, P6, P8, P9, and P10. The scenes S7 and S8 are assigned to the page image P5, the scene S9 is assigned to the page image P6, the scene S10 is assigned to the page image P8, the scenes S11 and S12 are assigned to the page image P9, and the scenes S13, S14, and S15 are assigned to the page image P10. The page images P5, P6, P8, P9, and P10 are generated again using the images included in the newly assigned scenes.

According to the tenth embodiment, even if a page image is deleted, scenes assigned to a plurality of images are reassigned. Therefore, an abrupt scene change in the plurality of page images is prevented.

Eleventh Embodiment

Figure 31:
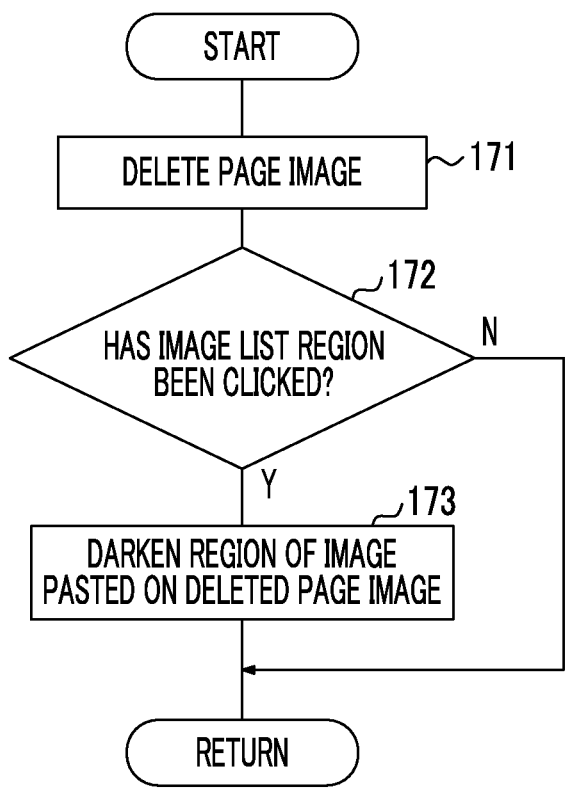
FIG. 31 is a flowchart showing the processing procedure of the page image display control system.
Figure 32:
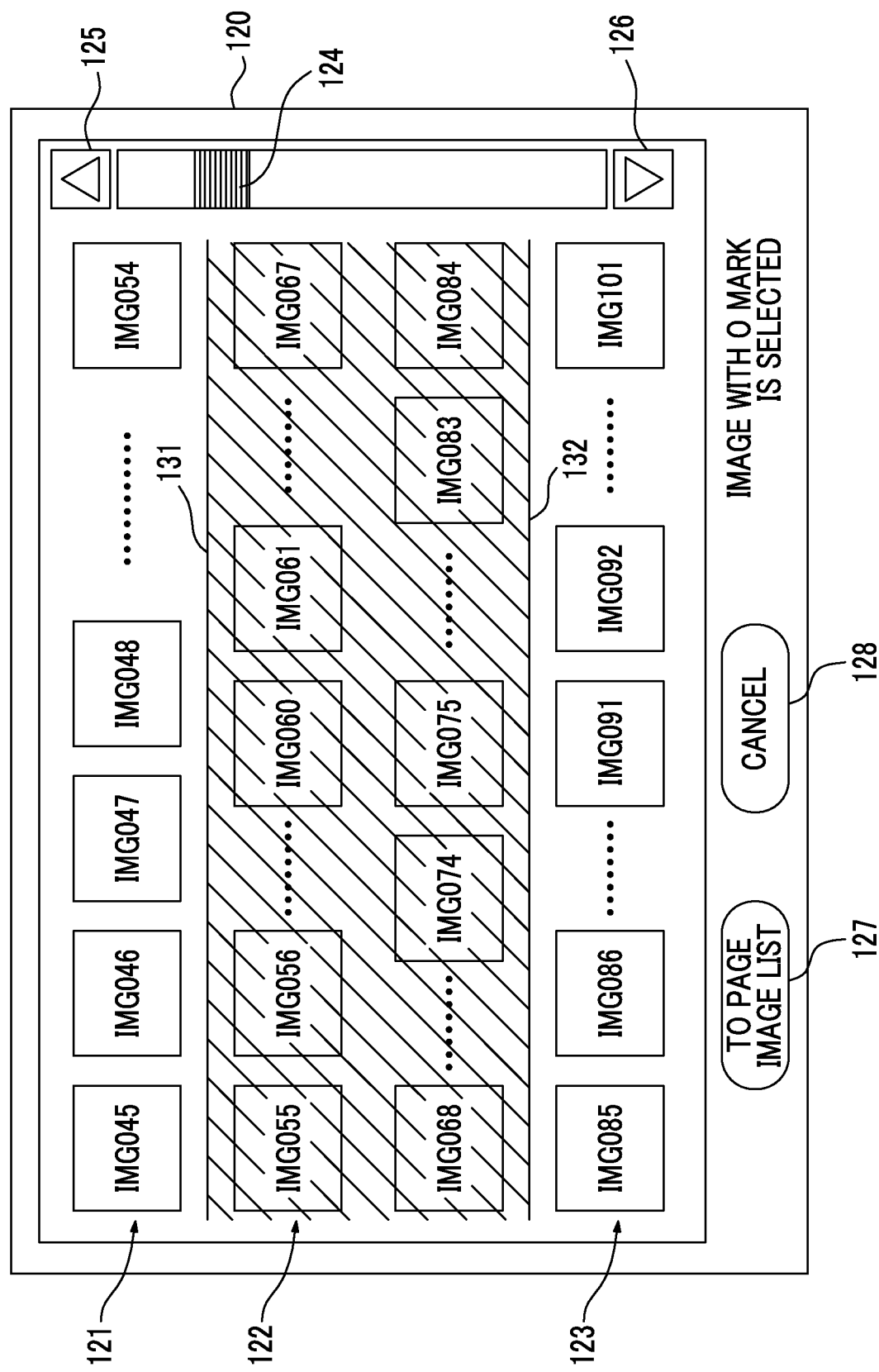
FIG. 32 is an example of an image list display window.

FIGS. 31 and 32 show an eleventh embodiment.

FIG. 31 is a flowchart showing a part of the processing procedure of the page image display control system 1. This flowchart is started when the page image deletion instruction region 42 is clicked.

In a case where the page image deletion instruction region 42 is clicked, a page image corresponding to the clicked page image deletion instruction region 42 is deleted (step 171).

In a case where the list display button 46 is clicked by the user using the mouse 4 after the page image deletion instruction region 42 is clicked (YES in step 172), the image list window 120 is displayed on the display screen of the display device 10 as shown in FIG. 32.

Then, a region (region corresponding to the scene assigned to the deleted page image) of an image pasted on the deleted page image is displayed so as to be distinguished from other regions by the display control device 9 (step 173). For example, it is assumed that the page image P2 is deleted. The scene assigned to the page image P2 is the scene S3, and the images represented by image file names IMG061, IMG066, IMG072, and IMG073 pasted on the page image P2 are images extracted from the images (images represented by image file name IMG055 to IMG084) included in the scene S3. Therefore, the region 122 where the images represented by the image file names IMG061, IMG066, IMG072, and IMG073 are included is displayed so as to be distinguished from the other regions 121 and 123. In the example shown in FIG. 22, the region 122 is hatched, so that the region 122 is displayed as to be distinguished from the other regions 121 and 123. Only the region 122 may be made dark, or only the region 122 may be made bright, or the background color of the region 122 may be changed.

According to the eleventh embodiment, the user can see which page image corresponding to which scene has been deleted.

According to the embodiments described above, the page image display control system 1 including the keyboard 3 or the mouse 4 has been described. However, the invention may also be implemented by a smart device such as a smart phone or a tablet terminal not including the keyboard 3 or the mouse 4. In the case of performing the above-described processing with the smart device, a command or the like is input using a touch panel formed in the smart device.

EXPLANATION OF REFERENCES

1: page image display control system
2: CPU
3: keyboard
4: mouse
5: input control device
6: hard disk drive
7: hard disk
8: memory
9: display control device
10: display device
11: memory card reader writer
12: memory card
13: CD-ROM drive
14: CD-ROM
15: communication device
40: page image list window
41: page image addition instruction region
42: page image deletion instruction region
43: initial window display button
44: window return button
45: album information display region
46: list display button
120: image list window
121: region
122: region
123: region
124: scroll button
125: up arrow button
126: down arrow button
127: page list display region
128: cancel button
131: partition line
132: partition line
133: partition line
Ar1: image pasting region
Ar2: image pasting region
Ar3: image pasting region
Ar4: image pasting region
Ar5: image pasting region
IMG001 to IMG500: image file name
P1 to P10: page images
S1 to S15: scene

What is claimed is:

1. A page image display control system comprising:
a processor configured to
display a plurality of page images, on each of which at least one of a plurality of images is pasted, on a display screen of a display device;
display a plurality of page image deletion instruction regions, each of which corresponds to each of the plurality of page images, with the plurality of page images on the display screen; and
in response to a page image deletion instruction given to a selected page image deletion instruction region of the plurality of page image deletion instruction regions, delete a selected page image corresponding to the selected page image deletion instruction region from the display screen, wherein the processor is further configured to:
- display at least part of the plurality of images on the display screen;
- display a region partition line with the at least part of the plurality of images on the display screen, the region partition line partitioned off a plurality of regions in each of which scene images included in each of scenes are arranged;
- generate each of the plurality of page images in which at least one image extracted from the scene images is pasted on a mount image; and
- display a selected region, in which an image pasted on the selected page image is included, so as to be distinguished from other region.

2. The page image display control system according to claim 1, wherein
- at least one of a plurality of scenes is assigned to each of the plurality of page images as an original assigned scene,
- the processer is configured to display the page images, on each of which scene images of the plurality of images included in the original assigned scene are pasted, on the display screen,
- a selected scene assigned to the selected page image is additionally assigned to at least one of a first page image or a second page image between which the selected page image is interposed as a additionally assigned scene, and
- at least one of the first page image or the second page image is generated using scene images included in the original assigned scene and the additionally assigned scene.

3. The page image display control system according to claim 1, wherein,
- in a case where a selected scene assigned to the selected page image is assigned to another page image, the processor is configured to extract an image from selected scene images included in the selected scene as a extracted image, and to generate the another page image again using the extracted image.

4. The page image display control system according to claim 1, wherein
- at least one of a plurality of scenes is assigned to each of the plurality of page images as an original assigned scene,
- at least one of scene images included in the original assigned scene are pasted on each of the plurality of page images, and
- the processer is configured to:
  - designate at least two page images, between which the selected page image is interposed, among the plurality of page images as designated page images;
  - assign a selected scene, which is assigned to the selected page image, and at least two scenes, which is assigned to the designated page images, to the at least two page images as new assigned scenes; and
  - generate each of the at least two page images using scene images included in the new assigned scenes.

5. The page image display control system according to claim 4, wherein the processor is configured to designate all of the plurality of page images displayed on the display screen as the designated page images.

6. The page image display control system according to claim 1, wherein the processor is further configured to display the selected region on the display screen such that brightness of the selected region is different from brightness of the other region.

7. The page image display control system according to claim 6, wherein the processor is further configured to display the selected region on the display screen such that background color of the selected region is different from background color of the other region.

8. The page image display control system according to claim 6, wherein the processor is further configured to:
- classify into the scene images of the scenes from the plurality of images; and
- arrange at least one of the scenes to each of the plurality of page images.

9. A page image display control method using the page image display control system according to claim 1, comprising:
- a display step that displays a plurality of page images, on each of which at least one of a plurality of images is pasted, on a display screen of a display device;
- a display step that displays a plurality of page image deletion instruction regions, each of which corresponds to each of the plurality of page images, with the plurality of page images on the display screen; and
- in response to a page image deletion instruction given to a selected page image deletion instruction region of the plurality of page image deletion instruction regions, a delete step that delete a selected page image corresponding to the selected page image deletion instruction region from the display screen.

10. A non-transitory computer readable medium storing a program for controlling a computer of the page image display control system according to claim 1, the program causing the computer to execute:
- displaying a plurality of page images, on each of which at least one of a plurality of images is pasted, on a display screen of a display device;
- displaying a plurality of page image deletion instruction regions, each of which corresponds to each of the plurality of page images, with the plurality of page images on the display screen; and
- in response to a page image deletion instruction given to a selected page image deletion instruction region of the plurality of page image deletion instruction regions, deleting a selected page image corresponding to the selected page image deletion instruction region from the display screen.

11. A page image display control system comprising:
a processor configured to
- display a plurality of images on a display screen of a display device;
- display a region partition line with the plurality of images on the display screen, and the region partition line partitioned off a plurality of regions in each of which scene images included in each of scenes are arranged;
- generates each of a plurality of page images in which at least one image extracted from the scene images is pasted on a mount image;
- display the plurality of page images on the display screen;
- delete a selected page image for which a page image deletion instruction is given, among the plurality of page images; and
- display a region, in which an image pasted on the selected page image is included, so as to be distinguished from other regions on the display screen.

12. A page image display control method using the page image display control system according to claim 11, comprising:

a display step that displays a plurality of images on a display screen of a display device;

a display step that displays a region partition line with the plurality of images on the display screen, and the region partition line partitioned off a plurality of regions in each of which scene images included in each of scenes are arranged;

a generate step that generates each of a plurality of page images in which at least one image extracted from the scene images is pasted on a mount image;

a display step that displays the plurality of page images on the display screen;

a delete step that delites a selected page image for which a page image deletion instruction is given, among the plurality of page images; and a display step that displays a region, in which an image pasted on the selected page image is included, so as to be distinguished from other regions on the display screen.

13. A non-transitory computer readable medium storing a program for controlling a computer of the page image display control system according to claim 11, the program causing the computer to execute:

displaying a plurality of images on a display screen of a display device;

displaying a region partition line with the plurality of images on the display screen, and the region partition line partitioned off a plurality of regions in each of which scene images included in each of scenes are arranged;

generating each of a plurality of page images in which at least one image extracted from the scene images is pasted on a mount image;

displaying the plurality of page images on the display screen;

deleting a selected page image for which a page image deletion instruction is given, among the plurality of page images; and displaying a region, in which an image pasted on the selected page image is included, so as to be distinguished from other regions on the display screen.

* * * * *